United States Patent
Gavenonis et al.

(10) Patent No.: US 9,765,208 B2
(45) Date of Patent: Sep. 19, 2017

(54) COMPOSITE WHEEL FOR A VEHICLE

(75) Inventors: John Gavenonis, Wilmington, DE (US); Anna Kutty Mathew, Kingston (CA); Karl Paul Maurer, North Branch, MN (US); Shengmei Yuan, Newark, DE (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 841 days.

(21) Appl. No.: 13/596,144

(22) Filed: Aug. 28, 2012

(65) Prior Publication Data

US 2013/0053500 A1    Feb. 28, 2013

Related U.S. Application Data

(60) Provisional application No. 61/528,438, filed on Aug. 29, 2011.

(51) Int. Cl.
| | |
|---|---|
| *C08L 77/00* | (2006.01) |
| *C08L 23/08* | (2006.01) |
| *C08K 5/00* | (2006.01) |
| *C08L 77/06* | (2006.01) |

(52) U.S. Cl.
CPC ............ *C08L 23/0815* (2013.01); *C08K 5/00* (2013.01); *C08L 77/06* (2013.01); *C08L 23/08* (2013.01)

(58) Field of Classification Search
CPC ....... C08L 77/00; C08L 77/06; C08K 3/0033; C08K 5/00; C08K 13/02; B60B 5/00
USPC ........................................................ 524/607
See application file for complete search history.

(56) References Cited

U.S. PATENT DOCUMENTS

| | | | |
|---|---|---|---|
| 4,072,358 A | 2/1978 | Ridha | |
| 4,174,358 A | 11/1979 | Epstein | |
| 5,254,466 A | 10/1993 | Picataggio et al. | |
| 5,277,479 A | 1/1994 | Koyama et al. | |
| 5,620,878 A | 4/1997 | Picataggio et al. | |
| 5,648,247 A | 7/1997 | Picataggio et al. | |
| 6,004,784 A | 12/1999 | Mobley et al. | |
| 6,066,480 A | 5/2000 | Mobley et al. | |

(Continued)

FOREIGN PATENT DOCUMENTS

| | | |
|---|---|---|
| EP | 1273663 | 8/2003 |
| GB | 1096326 | 12/1967 |

(Continued)

OTHER PUBLICATIONS

International Search Report, PCT/US2012/052847, dated Feb. 15, 2013.
Abstract EP0509282.

*Primary Examiner* — Jane L Stanley

(57) ABSTRACT

Disclosed is a injection molded composite wheel, including a thermoplastic polyamide composition consisting essentially of (A) 20 to 70 weight percent of at least one polyamide resin including at least one repeat unit selected from the group consisting of the formulas

| | |
|---|---|
| $-C(O)(CH_2)_{10}C(O)NH(CH_2)_nNH-$ | (I), |
| $-C(O)(CH_2)_{12}C(O)NH(CH_2)_nNH-$ | (II), |
| $-C(O)(CH_2)_{14}C(O)NH(CH_2)_nNH-$ | (III), and |
| $-C(O)(CH_2)_{16}C(O)NH(CH_2)_nNH-$ | (IV); | wherein n is an integer selected from 4, 6, and 10, and with the proviso that when the polyamide resin has repeat units of formula (I), at least one other repeat unit of formula (II)-(IV) is also present in at least 30 mol % content; (B) 20 to 65

(Continued)

weight percent of one or more fiber reinforcing agents, and (C) 0 to 20 weight percent of one or more polymer impact modifiers.

6 Claims, 3 Drawing Sheets

(56) References Cited

U.S. PATENT DOCUMENTS

| | | | |
|---|---|---|---|
| 6,288,275 | B1 | 9/2001 | Turner |
| 7,405,063 | B2 | 7/2008 | Eirich et al. |
| 2010/0105812 | A1* | 4/2010 | Bussi .................. C08G 69/265 524/35 |
| 2010/0233402 | A1* | 9/2010 | Doshi et al. ................. 428/36.9 |
| 2010/0237271 | A1* | 9/2010 | Stoppelmann ............. 252/62.54 |
| 2010/0324195 | A1 | 12/2010 | Williamson |
| 2011/0027571 | A1* | 2/2011 | Wakeman et al. ......... 428/293.4 |
| 2011/0165359 | A1* | 7/2011 | Le et al. .................... 428/36.91 |
| 2011/0189419 | A1* | 8/2011 | Le et al. ...................... 428/36.9 |
| 2011/0190433 | A1 | 8/2011 | Doshi |
| 2012/0001476 | A1 | 1/2012 | Yuan et al. |
| 2013/0049443 | A1 | 2/2013 | He et al. |

FOREIGN PATENT DOCUMENTS

| | | | |
|---|---|---|---|
| JP | 2001-234067 | 2/2000 | |
| WO | 0020620 | 4/2000 | |
| WO | WO 2010/004199 A2 * | 1/2010 | ............ C08G 69/14 |
| WO | 2010068904 | 6/2010 | |

\* cited by examiner

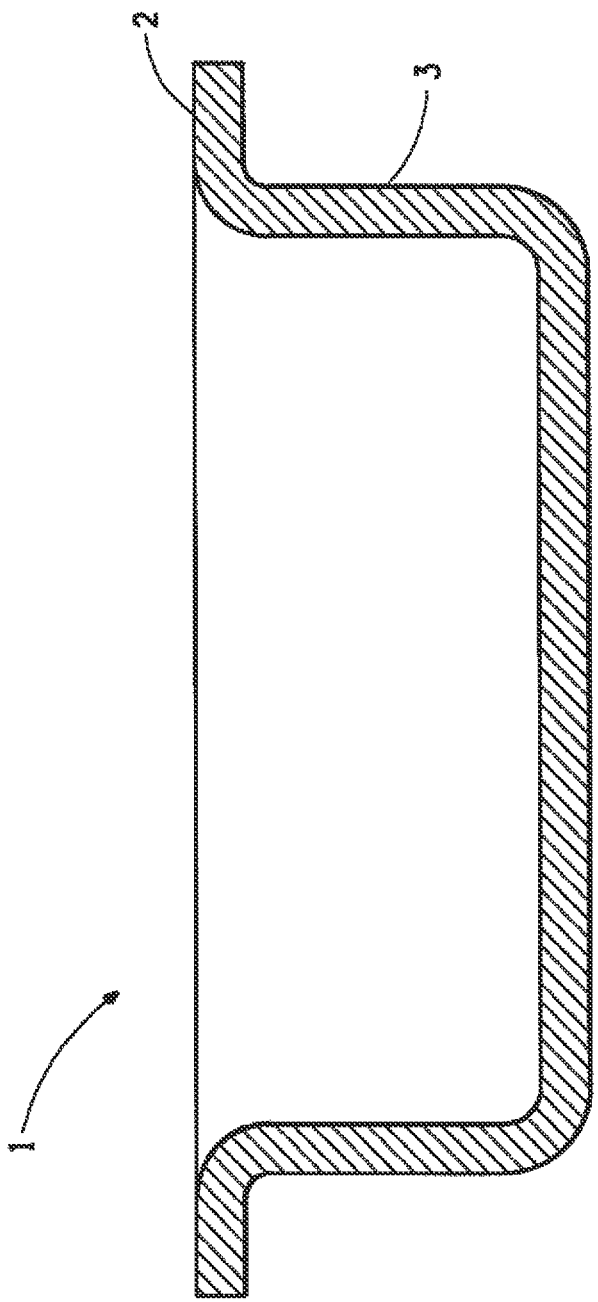

COMPOSITE WHEEL FOR A VEHICLE

CROSS REFERENCE TO RELATED APPLICATIONS

This application claims priority of Application No. 61/528,438, filed Aug. 29, 2011.

FIELD OF INVENTION

The present invention relates to the field of injection molded composite wheels for a vehicle including motorized vehicles.

BACKGROUND OF INVENTION

Weight reduction in all types of vehicles, including motorized vehicles, it) is an approach to improve the energy efficiency of vehicles. Glass reinforced plastics have been a key candidate to replace metal to reduce weight of vehicles. A plastic wheel rim is one example. Low density reinforced plastics have been a key factor for plastic wheels in bicycle, all terrain-vehicle (ATV), utility vehicle (UTV), and potentially automotive vehicle.

However, thermoplastics have lower strength and modulus compared to metal. Fiber reinforcement significantly improves strength and modulus of thermoplastics but reduces elongation at break and ultimately makes plastic more brittle. It is desirable to have a reinforced thermoplastic with high strength, high stiffness; and high elongation. Most 30~40 weight percent fiber reinforced thermoplastic polyamides and other polymers give 10~12 Gpa tensile modulus and 2.5~3.0% elongation at break.

U.S. Pat. No. 4,072,358 discloses a compression molded cut glass fiber reinforced plastic wheel, said cut glass fibers being from 0.125 to 1.5 inches in length.

U.S. Pat. No. 5,277,479 discloses a resin wheel comprising a rim and a disk molded integrally, and the wheel is formed by injection molding a fiber-reinforced thermoplastic resin wherein the fiber-reinforced thermoplastic resin comprises short fibers (0.1-0.5 mm) and long-fibers (>1 mm).

US application publication 2012/0001476 discloses injection molded composite wheels comprising a polyimide composition.

Another problem with some metal alloys and some polymers is salt stress (induced) corrosion cracking (SSCC), where a part under stress undergoes accelerated corrosion when under stress and in contact with inorganic salts. This often results in cracking and premature failure of the part.

US Patent Publication 2010/0233402 entitled "Salt Resistant Polyamide Compositions" discloses certain semi-aromatic copolyamides that exhibit improved chemical resistance especially to metal halides and salts compared to corresponding aliphatic homopolyamides. In these copolyamides, at least 15 mole percent of the repeat units are derived from monomers that comprise an aromatic structure. Thus, semi-aromatic copolyamides 612/6T comprising 20 to 30 mole percent 6T units exhibit improved salt resistance than corresponding homopolyamide PA 612.

The presence of two or more types of repeat units in a copolyamide however typically has a negative consequence. These copolyamides have reduced degree of crystallinity. As a result they exhibit inferior high temperature properties compared to the corresponding homopolyamides. These properties include such mechanical properties as stiffness, strength and creep resistance at high temperature that are important in many of their end-uses. As the aromatic repeat unit content increases to approach 50 mole percent, the polymer becomes increasingly amorphous, and correspondingly exhibits greater loss in high temperature properties.

Furthermore, increasing petroleum raw material prices make it desirable to develop engineering polymers from linear, long chain dicarboxylic acids from renewable feedstocks. As such, there is a demand for renewable bio-based polymers having similar or better performance characteristics than petrochemical-based polymers. As example, renewable nylon materials such as PA 610 are based on ricinoleic acid derived sebacic acid (C10). However, ricinoleic acid production requires the processing castor beans and involves the handling of highly allergenic material and highly toxic ricin. Moreover, the production of sebacic acid is burdened with high energy consumption, a large amount of salt by product and other byproducts.

WO 2010/068904 discloses a method to produce renewable alkanes from biomass based triglycerides in high yield and selectivity and their fermentation to renewable diacids. Such naturally occurring triglycerides, also referred to as oils and fats, are composed of a variety of fatty acid chain lengths specific to the type of fat and oil. Most abundant amongst vegetable oils are triglycerides based on C12, C14, C16 and C18 fatty acids. Several vegetable oils are rich C12-C18 fatty esters including soybean oil, palm oil, sunflower oil, olive oil, cotton seed oil and corn oil (Ullmann's Encyclopedia of Technical Chemistry, A. Thomas: "Fats and Fatty Oils" (2005 Wiley-VCH Verlag GmbH & Co. KGaA, Weinheim; electronic version, 10.1002/14356007.a10 173). As such, dioic acid streams based on the oxidative fermentation of renewable alkanes derived from such oils, being rich in C12-C18 dioic acids, may be useful in formation of economically and environmentally attractive polymers.

Thus, desired are thermoplastic polymers that make use of renewable C12-C18 dioic acids. Also desired are thermoplastic compositions that have favorable properties for injection molding, provide high resistance to salt stress (induced) corrosion cracking, and exhibit high tensile modulus, that is, greater or equal to 8.5 Gpa, and high elongation at break, that is, greater or equal to 4% elongation at break. Such thermoplastic compositions would be especially useful in fiber reinforced wheels to provide the toughness is properties and salt resistance satisfactory for many vehicle applications.

SUMMARY OF INVENTION

Disclosed is an injection molded composite wheel, comprising a thermoplastic polyamide composition comprising (A) 20 to 70 weight percent of at least one polyamide resin consisting essentially of at least one repeat unit selected from the group consisting of the formulas $$—C(O)(CH_2)_{10}C(O)NH(CH_2)_nNH— \quad (I),$$

$$—C(O)(CH_2)_{12}C(O)NH(CH_2)_nNH— \quad (II),$$

$$—C(O)(CH_2)_{14}C(O)NH(CH_2)_nNH— \quad (III), \text{ and}$$

$$—C(O)(CH_2)_{16}C(O)NH(CH_2)_nNH— \quad (IV);$$

wherein n is an integer selected from 4, 6, and 10, and with the proviso that when the polyamide resin has repeat units of formula (I), at least one other repeat unit of formula (II)-(IV) is also present in at least 30 mol % content;

(B) 20 to 65 weight percent of one or more fiber reinforcing agents; and (C) 0 to 20 weight percent of one or more polymeric toughener;
wherein the weight percentages of (A), (B), and (C) are based on the total weight of (A)+(B)+(C).

BRIEF DESCRIPTION OF THE DRAWINGS

FIG. 3 is a cross-sectional view of a wheel test specimen used in an upward and downward (throw-down) impact test.

DETAILED DESCRIPTION OF THE INVENTION

Figure 1:
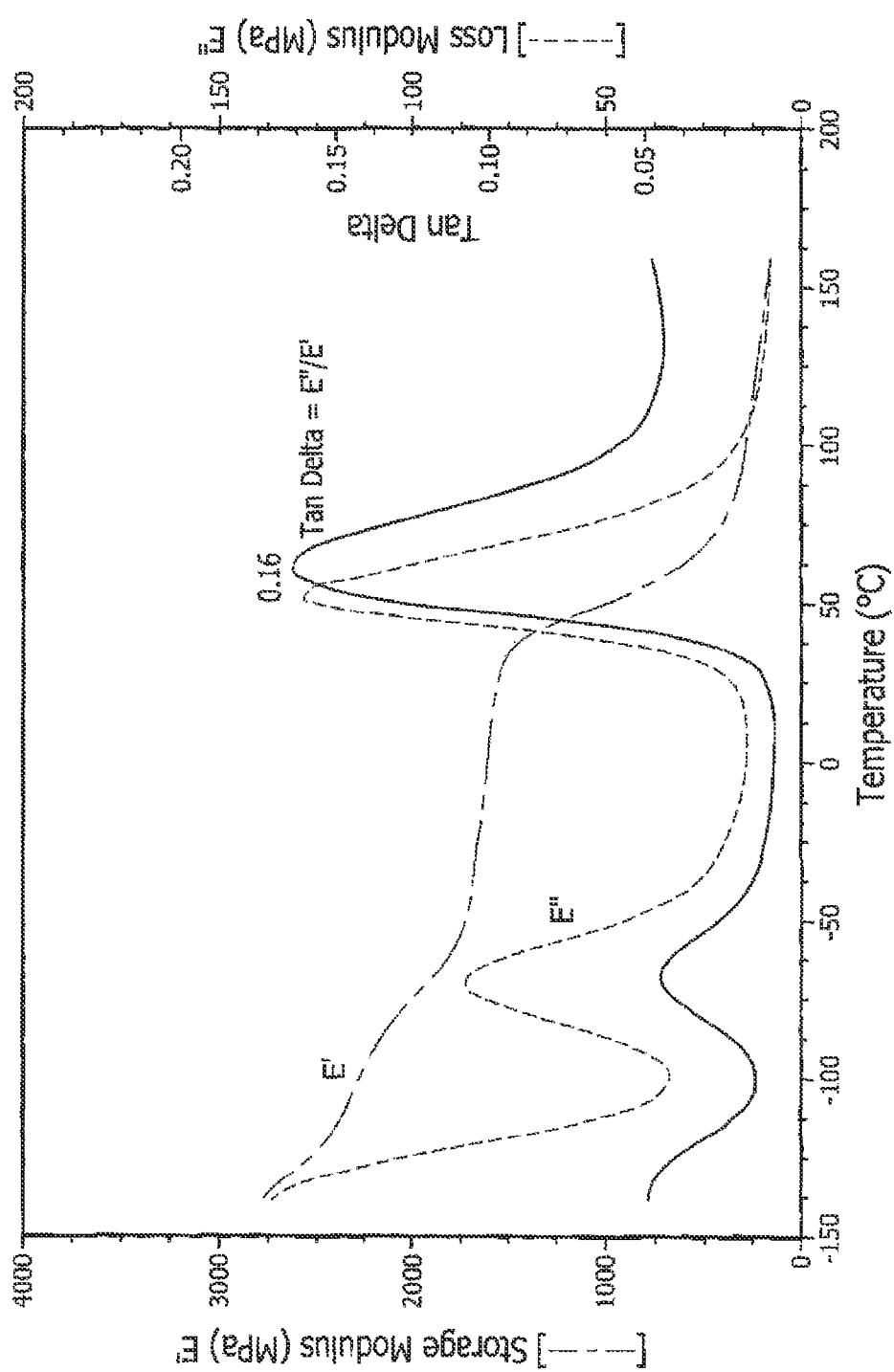
FIG. 1 shows a dynamic mechanical analysis of a semi-crystalline copolymer.

By a "vehicle" is meant any device which moves on wheels and transports people and/or freight or performs other functions. The vehicle may be self propelled or not. Applicable vehicles include automobiles, motorcycles, wheeled construction vehicles, farm or lawn tractors, all terrain vehicles (ATVs), trucks, trailers, bicycles, carriages, shopping carts, wheel barrows, and dollies.

The injection molded composite wheel, comprises a polyamide composition comprising (A) 20 to 70 weight percent of at least one polyamide resin, (B) 20 to 65 weight percent of one or more fiber reinforcing agents, preferably wherein said fiber has an average length of 0.1 to 3.0 mm, or 0.1 to 0.9 mm; and (C) 0 to 20 weight percent of one or more polymeric tougheners.

Another embodiment is an injection molded composite wheel comprising a polyamide composition comprising (A) 20 to 68 weight percent of at least one polyamide resin, (B) 20 to 65 weight percent of one or more fiber reinforcing agents, preferably wherein said fiber has an average length of 0.1 to 0.9 mm; and (C) 2 to 20 weight percent of one or more polymeric tougheners.

Another embodiment is an injection molded composite wheel comprising a polyamide composition comprising (A) 20 to 65 weight percent of at least one polyamide resin, (B) 20 to 65 weight percent of one or more fiber reinforcing agents, preferably wherein said fiber has an average length of 0.1 to 0.9 mm; and (C) 5 to 12 weight percent of one or more polymeric tougheners.

Another embodiment is an injection molded composite wheel comprising a polyamide composition comprising (A) 30 to 65 weight percent of at least one polyamide resin, (B) 23 to 55 weight percent of one or more fiber reinforcing agents, preferably wherein said fiber has an average length of 0.1 to 0.9 mm; and (C) 5 to 12 weight percent of one or more polymeric tougheners.

Another embodiment is an injection molded composite wheel comprising a polyamide composition comprising (A) 40 to 60 weight percent of at least one polyamide resin, (B) 35 to 50 weight percent of one or more fiber reinforcing agents, preferably wherein said fiber has an average length of 0.1 to 0.9 mm; and (C) 5 to 12 weight percent of one or more polymeric tougheners.

The polyamide resin used in the present invention has a melting point and/or glass transition. Herein melting points and glass transitions are as determined with differential scanning calorimetry (DSC) at a scan rate of 10° C./min, wherein the melting point is taken at the maximum of the endothermic peak in the first heat cycle, the heat of fusion in Joules/gram (J/g) is the area within the endothermic peak, and the glass transition, if evident, is considered is the mid-point of the change in enthalpy.

Herein freezing points are as determined with DSC in the cooling cycle at a scan rate of 10° C./min carried out after the first heating cycle as per ASTM D3418.

Herein the term delta melting point minus freezing point (MP-FP, in ° C.) is the difference between the melting point and freezing point of a particular polymer or copolymer, wherein the melting point and freezing point are determined as disclosed above. The term delta MP-FP is one measure of the crystallinity of polymer or copolymer and, in part, determines the crystallization kinetics of the polymer or copolymer. A low delta MP-FP typically gives high crystallization rates; and faster cycle times in injected molded parts. A low delta MP-FP typically gives desirable high temperature properties in extrusion processing as well.

Dynamic mechanical analysis (DMA) is used herein for determination of storage modulus (E') and loss modulus (E), and glass transition, as a function of temperature. Tan delta is a curve resulting from the loss modulus divided by the storage modulus (E"/E') as a function of temperature.

Dynamic mechanical analysis is discussed in detail in "Dynamic Mechanical Analysis: A practical Introduction," Menard K. P., CRC Press (2008) ISBN is 978-1-4200-5312-8. Storage modulus (E'), loss modulus (E") curves exhibit specific changes in response to molecular transitions occurring in the polymeric material in response to increasing temperature. A key transition is called glass transition. It characterizes a temperature range over which the amorphous phase of the polymer transitions from glassy to rubbery state, and exhibits large scale molecular motion. Glass transition temperature is thus a specific attribute of a polymeric material and its morphological structure. For the copolyamide compositions disclosed herein, the glass transition occurs over a temperature range of about 20 to about 90° C. The Tan delta curve exhibits a prominent peak in this temperature range. This peak tan delta temperature is defined in the art as the tan delta glass transition temperature, and the height of the peak is a measure of the crystallinity of the polymeric material. A polymeric sample with low or no crystallinity exhibits a tall tan delta peak due to large contribution of the amorphous phase molecular motion, while a sample with high level of crystallinity exhibits a smaller peak because molecules in crystalline phase are not able to exhibit such large scale rubbery motion. Thus, herein the value of tan delta glass transition peak is used as a comparative indicator of level of crystallinity in the copolyamides and melt-blended thermoplastic polyamide compositions.

FIG. 1 shows a dynamic mechanical analysis of a crystalline copolymer showing the storage modulus (E'), loss modulus (E") curves and computed tan delta curve (E"/E'). A higher tan delta peak corresponds to lower crystallinity and conversely, a lower tan delta peak corresponds to higher crystallinity; as discussed in "Thermal Analysis of Polymers," Sepe M. P., Rapra Review Reports, Vol. 8, No. 11 (1977).

Polyamides are condensation products of one or more dicarboxylic acids and one or more diamines, and/or one or more aminocarboxylic acids, and/or ring-opening polymerization products of one or more cyclic lactams. Suitable cyclic lactams are caprolactam and laurolactam. Polyamides may be fully aliphatic or semi-aromatic.

The Copolymers disclosed herein have two or more diamide molecular repeat units. The copolymers are identified by their respective repeat units. The following list exemplifies the abbreviations used to identify monomers and repeat units in the homopolymer and copolymer polyamides (PA) disclosed herein:

TMD 1,4-tetramethylene diamine
HMD 1,6-hexamethylene diamine (or 6 when used in combination with a diacid)
AA adipic acid
DMD decamethylenedia nine
6 ε-Caprolactam
16 hexadecane dioic acid
18 octadecanedioic acid
DDA decanedioic acid
DDDA dodecanedioic acid
TDDA tetradecanedioic acid
TMD 1,4-tetramethylene diamine
66 polymer repeat unit formed from HMD and AA
610 polymer repeat unit formed from HMD and DDA
612 polymer repeat unit formed from HMD and DDDA
614 polymer repeat unit formed from HMD and TDDA
616 polymer repeat unit formed from HMD and hexadecane dioic acid
618 polymer repeat unit formed from HMD and octadecane dioic acid
6 polymer repeat unit formed from ε-caprolactam
11 polymer repeat unit formed from 11-aminoundecanoic acid
12 polymer repeat unit formed from 12-aminododecanoic acid Note that in the art the term "6" when used alone designates a polymer repeat unit formed from ε-caprolactam. Alternatively "6" when used in combination with a diacid such as adipic acid, for instance 66, the "6" refers to HMD. In repeat units comprising a diamine and diacid, the diamine is designated first. Furthermore, when "6" is used in combination with a diamine, for instance 66, the first "6" refers to the diamine HMD, and the second "6" refers to adipic acid. Likewise, repeat units derived from other amino acids or lactams are designated as single numbers designating the number of carbon atoms.

Copolymer repeat units are separated by a slash (that is, /). For instance poly(hexamethylene dodecanediamide/hexamethylene tetradecanediamide) is abbreviated PA6121614 (75/25), and the values in brackets are the mole % repeat unit of each repeat unit in the copolymer.

In various embodiments the polyamide resins useful in the composite wheels consists essentially of at least one repeat unit selected from the group consisting of the formulas

  (I),

  (II),

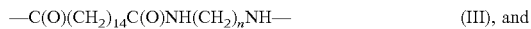  (III), and

  (IV);

wherein n is an integer selected from 4, 6, and 10, and with the proviso that when the polyamide resin has repeat units of formula (I), at least one other repeat unit of formula (II)-(IV) is also present in at least 30 mol % content, and preferably at least 40, 50, 60, or 80 mol % content.

In various embodiments of the composite wheel the polyamide resin consist essentially of repeat units selected from the group consisting of formula (II), formula (III) and formula (IV).

In various embodiments of the composite wheel the polyamide resin consist essentially of repeat units of formula (I) and (II). The polyamide resin may have 50 to 92 mole percent repeat units of formula (I) and 8 to 50 repeat units of formula (II).

In various embodiments of the composite wheel the polyamide resin consist essentially of repeat units of formula ((II) and (III); and preferably having 8 to 92 mole percent repeat units of formula (II) and 8 to 92 repeat units of formula (III). The polyamide resin may have 50 to 92 mole percent repeat units of formula (II) and 8 to 50 repeat units of formula (III).

In various embodiments of the composite wheel the polyamide resin consist essentially of repeat units of formula ((III) and (IV); and preferably having 8 to 92 mole percent repeat units of formula (III) and 8 to 92 repeat units of formula (IV). The polyamide resin may have 50 to 92 mole percent repeat units of formula (III) and 8 to 50 repeat units of formula (IV).

In various embodiments of the composite wheel the polyamide resin consist essentially of repeat units of formula (II), ((III) and (IV); and preferably having 4 to 92 mole percent repeat units of formula (II), 4 to 92 mole percent repeat units of formula (III), and 4 to 92 repeat units of formula (IV). The polyamide resin may have 50 to 92 mole percent repeat units of formula (III) 4 to 46 mole percent repeat units of formula (III) and 4 to 46 mole percent repeat units of formula (IV).

In preferred embodiments of the composite wheel, the polyamide resin consist essentially of repeat units of any of those combinations disclosed above wherein n is 6.

The term "consist essentially of" means the embodiment necessarily includes the listed ingredients and is open to unlisted ingredients that do not materially affect the basic and novel properties of the invention. Herein, for instance, the term as applied to the polyamide resin, means the polyamide includes the repeat units of formula (I)-(IV), for instance, and may include other repeat units in small amounts, so long as the additional repeat units do is not materially affect the basic and novel properties of the invention. The basic properties of the polyamide resin include a delta MP-FP of less than 40° C., and preferably less than 30° C.; and a tan delta peak value, as measured with DMA, of less than 0.23; and preferably less than 0.20.

In one embodiment the polyamide resin useful in the composite wheel have a delta MP-F, as measured with DSC, of less than 40° C., and preferably less than 30° C.; and a tan delta peak value, as measured with DMA, of less than 0.23; and preferably less than 0.20. Another preferred property of the polyamide resin is a zinc chloride salt resistance, as disclosed herein, of at least 72 hours at 50° C.

The basic properties of the thermoplastic compositions useful in composite wheels include a tensile strength of at least 10 GPa, and an elongation at break of at least 4.0%, preferably at least 4.5% and more preferably at least 5.0%, measured as disclosed herein.

The copolyamides useful in the invention are preferably prepared from aliphatic dioic acids and aliphatic diamines, at least one of which is bio-sourced or "renewable". By "bio-sourced" is meant that the primary feed-stock for preparing the dioic acid and/or diamine is a renewable biological source, for instance, vegetable matter including grains, vegetable oils, cellulose, lignin, fatty acids; and animal matter including fats, tallow, oils such as whale oil, fish oils, and the like. These bio-sources of dioic acids and aliphatic diamines have a unique characteristic in that they all possess high levels of the carbon isotope $^{14}C$; as compared to fossil or petroleum sources of the dioic acids and aliphatic diamines. This unique isotope feature remains unaffected by non-nuclear, conventional chemical modifications. Thus the $^{14}C$ isotope level in bio-sourced materials provides an unalterable feature that allows any downstream products, such as polyamides; or products comprising the polyamides, to be unambiguously identified as comprising a bio-sourced material. Furthermore, the analysis of $^{14}C$ isotope level in dioic acids, to diamines and downstream product is sufficiently accurate to verify the percentage of bio-sourced carbon in the downstream product.

The copolyamides are prepared from aliphatic dioic acids and aliphatic diamines using conventional chemical methods as are well known in the art of polyamides. See, Kohan in "Nylon Plastics Handbook," Melvin I. Kohan, Ed., Hanser Publlishers (1995).

Preferred renewable copolyamides are wherein the repeat units (I)-(IV) are prepared from C12, C14, C16 and C18 dioic acids derived from vegetable oils selected from the group consisting of soybean oil, palm oil, sunflower oil, olive oil, cotton seed oil, peanut oil and corn oil.

Bio-sources of the aliphatic dioic acids are available by well known fermentation processes combined with conventional isolation and purification processes. For instance, 1,14-tetradecanedioic acid is available by biofermnentation of methyl myristate using Candida tropicalis according to the procedures disclosed in U.S. Pat. Nos. 6,004,784 and 6,066,480, hereby incorporated by reference. Other $\alpha,\omega$-alkanedicarboxylic acids are also available using similar fermentation methods with other fatty acids, or fatty esters. The aliphatic dioic acids can be isolated from the fermentation broth using well known procedures in the art. For instance, GB patent 1,096,326, disclose the ethyl acetate extraction of a fermentation broth, followed by esterification of the extract with methanol and sulfuric acid catalysis to provide the corresponding dimethyl ester of the dioic acid.

Preferred renewable linear dioic acids useful in the invention, rich in C12, C14, C16 and C18 dioic acids, may be derived from vegetable oils selected from the group consisting of soybean oil, palm oil, palm kernel oil, coconut oil, sunflower oil, olive oil, cotton seed oil and corn oil. The biomass based triglycerides are first hydrotreated according to procedures disclosed in WO 2010/068904 to provide renewable C12, C14, C16 and C18 linear alkanes in high yield. The linear alkanes can be purified using the distillation procedures disclosed herein in the material section to provide greater than 98 wt % purity and preferably greater than 99 wt % purity C12-C18 alkanes, respectively.

The linear alkane(s) of $C_n$ chain length may be fermented separately to the desired linear dicarboxylic acid(s) of $C_n$ chain length, where n=16 or 18. Methods and microorganisms for fermenting linear alkanes to linear dicarboxylic acids are known, such as those described, for example, in U.S. Pat. Nos. 5,254,466; 5,620,878; 5,648,247, 7,405,063 and Published Application US 2004/0146999 (each of which is by this reference incorporated in its entirety as a part hereof for all purpose); and in EP 1 273 663. Methods for recovering linear dicarboxylic acids from fermentation broth are also known, as disclosed in at least some of the references cited above and also, for example, in published patent application WO 2000/20620 and U.S. Pat. No. 6,288,275.

Fermentation may be by any suitable biocatalyst having alkane hydroxylating activity. The alkane hydroxylating activity is responsible for the hydroxylation of a terminal methyl group. Additional enzymatic steps are required for further oxidation to the carboxylate form. Two further oxidation steps, catalyzed by alcohol oxidase [Kemp et al., Appl. Microbiol. and Biotechnol., 28:370 (1988)] and alcohol dehydrogenase, lead to the corresponding carboxylate.

Particularly suitable as biocatalysts are microorganisms that are genetically engineered for enhanced alkane hydroxylating activity. The enhanced hydroxylating activity may be due to enhanced alkane monooxygenase, fatty acid monooxygenase or cytochrome P450 reductase separately or in various combinations. For example, suitable biocatalysts may be microorganisms such as yeast of the genera Candida, Pichia, or Saccharomyces that have been genetically engineered to express increased cytochrome P450 monooxygenase activity and/or increased cytochrome P450 reductase activity. Separately or in addition, a suitable biocatalyst may be genetically engineered to disrupt the β-oxidation pathway. Disrupting the β-oxidation pathway increases metabolic flux to the ω-oxidation pathway and thereby increases the yield and selectivity of a bioprocess for conversion of alkanes to mono- and di-terminal carboxylates.

As an example, US Published Application 2004/0146999 discloses a process for the bioproduction of C6 to C22 mono- and di-carboxylic acids by contacting, under aerobic conditions, transformed Pichia pastoris characterized by a genetically engineered enhanced alkane hydroxylating activity or transformed Candida maltosa characterized by a genetically engineered enhanced alkane hydroxylating activity with at least one C6 to C22 straight chain hydrocarbon in the form $CH_3(CH_2)_xCH_3$ wherein x=4 to 20. The reference also discloses a transformed Pichia pastoris comprising at least one foreign gene encoding a cytochrome P450 monooxygenase and at least one foreign gene encoding a cytochrome P450 reductase, each gene operably linked to suitable regulatory elements such that alkane hydroxylating activity is enhanced. Also disclosed are genetically-engineered Candida maltosa strains that have enhanced cytochrome P450 activity and/or gene disruptions in the β-oxidation pathway. Genetic engineering may be as described in US Published Application 2004/0146999 or by additional methods well known to one skilled in the art. Known promoters, coding regions, and termination signals may be used for expression of enzyme activities.

The polyamide resins useful in various embodiments preferably have a carbon content wherein the carbon content comprises at least 50 percent modern carbon (pMC), as determined with the ASTM-D6866 Biobased Determination method. In other embodiments the polyamide resin has a modern carbon content of at least 60, 65, 70, 75, 80, and 85 pMC, respectively, as determined with the ASTM-D6866 Method.

The ASTM-D6866 method to derive a "Biobased content" is built on the same concepts as radiocarbon dating, but without use of the age equations. The method relies on determining a ratio of the amount of radiocarbon ($^{14}C$) in an unknown sample to that of a modern reference standard. The ratio is reported as a percentage with the units "pMC" (percent modern carbon). If the material being analyzed is a mixture of present day radiocarbon and fossil carbon (fossil carbon being derived from petroleum, coal, or a natural gas source), then the pMC value obtained correlates directly to the amount of Biomass material present in the sample.

The modern reference standard used in radiocarbon dating is a National Institute of Standards and Technology—USA (NIST-USA) standard with a known radiocarbon content equivalent approximately to the year AD 1950. AD 1950 was chosen since it represented a time prior to thermonuclear weapons testing which introduced large amounts of excess radiocarbon into the atmosphere with each explosion (termed "bomb carbon"). This was a logical point in time to use as a reference for archaeologists and geologists. For those using radiocarbon dates, AD 1950 equals "zero years old". It also represents 100 pMC.

"Bomb carbon" in the atmosphere reached almost twice normal levels in 1963 at the peak of testing and prior to the treaty halting the testing. Its distribution within the atmosphere has been approximated since its appearance, showing values that are greater than 100 pMC for plants and animals living since AD 1950. It's gradually decreased over time with today's value being near 107.5 pMC. This means that a fresh biomass material such as corn, vegetable oils, etc, and materials derived therefrom, would give a radiocarbon signature near 107.5 pMC.

The radiocarbon dating isotope ($^{14}C$), with its nuclear half life of 5730 years, clearly allows one to apportion specimen carbon between fossil carbon ("dead") and biospheric ("alive") feedstocks. Fossil carbon, depending upon its source, has very close to zero $^{14}C$ content.

Combining fossil carbon with present day carbon into a material will result in a dilution of the present day pMC content. By presuming 107.5 pMC represents present day biomass materials and 0 pMC represents petroleum (fossil carbon) derivatives, the measured pMC value for that material will reflect the proportions of the two component types. Thus, a material derived 100% from present day vegetable oil would give a radiocarbon signature near 107.5 pMC. If that material was diluted with 50% petroleum derivatives, it would give a radiocarbon signature near 54 pMC.

A biomass content result is derived by assigning 100% equal to 107.5 pMC and 0% equal to 0 pMC. In this regard, a sample measuring 99 pMC will give an equivalent Biobased content result of 93%. This value is referred to as the "Mean Biobased Result" and assumes all the components within the analyzed material were either present day living or fossil in origin.

The results provided by the ASTM D6866 method are the Mean Biobased Result and encompasses an absolute range of 6% (plus and minus 3% on either side of the Mean Biobased Result) to account for variations in end-component radiocarbon signatures. It is presumed that all materials are present day or fossil in origin. The result is the amount of biobased component "present" in the material, not the amount of biobased material "used" in the manufacturing process.

Several commercial analytical laboratories have capabilities to perform ASTM-D6866 method. The analyses herein were conducted by Beta Analytics Inc, Miami Fla., USA.

The one or more fiber reinforcing agents are selected from the group consisting of glass fiber, carbon fiber, and a mixture thereof. Preferably the fiber reinforcing agent has an average length of 0.1 to 0.9 mm. Glass fiber can be of circular or noncircular cross-section.

Glass fibers with noncircular cross-section refer to glass fiber having a cross section having a major axis lying perpendicular to a longitudinal direction of the glass fiber and corresponding to the longest linear distance in the cross section. The non-circular cross section has a minor axis corresponding to the longest linear distance in the cross section in a direction perpendicular to the major axis. The non-circular cross section of the fiber may have a variety of shapes including a cocoon-type (figure-eight) shape, a rectangular shape; an elliptical shape; a roughly triangular shape; a polygonal shape; and an oblong shape. As will be understood by those skilled in the art, the cross section may have other shapes. The ratio of the length of the major axis to that of the minor access is preferably between 0.5:1 and 6:1. The ratio is more preferably between 2:1 and 5:1 and yet more preferably between 3:1 to 4:1. Suitable glass fiber are disclosed in EP 0 190 001 and EP 0 196 194.

The thermoplastic composition may comprise 0 to 20 weight percent polymeric toughener. The polymeric toughener is a polymer, typically an elastomer having a melting point and/or glass transition points below 25° C., or is rubber-like, i.e., has a heat of melting (measured by ASTM Method D3418-82) of less than about 10 J/g, more preferably less than about 5 J/g, and/or has a melting point of less than 80° C., more preferably less than about 60° C. Preferably the polymeric toughener has a weight average molecular weight of about 5,000 or more, more preferably about 10,000 or more, when measured by gel permeation chromatography using polyethylene standards.

The polymeric toughener can be a functionalized toughener, a nonfunctionalized toughener, or blend of the two.

A functionalized toughener has attached to it reactive functional groups which can react with the polyamide. Such functional groups are usually "attached" to the polymeric toughener by grafting small molecules onto an already existing polymer or by copolymerizing a monomer containing the desired functional group when the polymeric tougher molecules are made by copolymerization. As an example of grafting, maleic anhydride may be grafted onto a hydrocarbon rubber (such as an ethylene/α-olefin copolymer, an α-olefin being a straight chain olefin with a terminal double bond such a propylene or 1-octene) using free radical grafting techniques. The resulting grafted polymer has carboxylic anhydride and/or carboxyl groups attached to it.

Ethylene copolymers are an example of a polymeric toughening agent wherein the functional groups are copolymerized into the polymer, for instance, a copolymer of ethylene and a (meth)acrylate monomer containing the appropriate functional group. Herein the term (meth)acrylate means the compound may be either an acrylate, a methacrylate, or a mixture of the two. Useful (meth)acrylate functional compounds include (meth)acrylic acid, 2-hydroxyethyl(meth)acrylate, glycidyl(meth)acrylate, and 2-isocyanatoethyl (meth)acrylate. In addition to ethylene and a functionalized (meth)acrylate monomer, other monomers may be copolymerized into such a polymer, such as vinyl acetate, unfunctionalized (meth)acrylate esters such as ethyl (meth)acrylate, n-butyl (meth)acrylate, i-butyl (meth)acrylate and cyclohexyl (meth)acrylate. Polymeric tougheners include those listed in U.S. Pat. No. 4,174,358, which is hereby incorporated by reference.

Another functionalized toughener is a polymer having carboxylic acid metal salts. Such polymers may be made by grafting or by copolymerizing a carboxyl or carboxylic anhydride containing compound to attach it to the polymer. Useful materials of this sort include Surlyn® ionomers available from E. I. DuPont de Nemours & Co. Inc., Wilmington, Del. 19898 USA, and the metal neutralized maleic anhydride grafted ethylene/α-olefin polymer described above. Preferred metal cations for these carboxylate salts include Zn, Li, Mg and Mn.

Polymeric tougheners useful in the invention include those selected from the group consisting of linear low density polyethylene (LLDPE) or linear low density polyethylene grafted with an unsaturated carboxylic anhydride, ethylene copolymers; ethylene/α-olefin or ethylene/α-olefin/diene copolymer grafted with an unsaturated carboxylic anhydride; core-shell polymers, and nonfunctionalized tougheners, as defined herein.

Herein the term ethylene copolymers include ethylene terpolymers and ethylene multi-polymers, i.e. having greater than three different repeat units. Ethylene copolymers useful as polymeric tougheners in the invention include those selected from the group consisting of ethylene copolymers of the formula E/X/Y wherein:

E is the radical formed from ethylene;

X is selected from the group consisting of radicals formed from

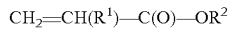

wherein $R^1$ is H, $CH_3$ or $C_2H_5$, and $R^2$ is an alkyl group having 1-8 carbon atoms; vinyl acetate; and mixtures thereof; wherein X comprises 0 to 50 weight % of E/X/Y copolymer;

Y is one or more radicals formed from monomers selected from the group consisting of carbon monoxide, sulfur dioxide, acrylonitrile, maleic anhydride, maleic acid diesters, (meth)acrylic acid, maleic acid, maleic acid monoesters, itaconic acid, fumaric acid, fumaric acid monoesters and potassium, sodium and zinc salts of said preceding acids, glycidyl (meth)acrylate, 2-hydroxyethyl (meth)acrylate, 2-isocyanatoethyl (meth)acrylate and glycidyl vinyl ether; wherein Y is from 0.5 to 35 weight % of the E/X/Y copolymer, and preferably 0.5-20 weight percent of the E/X/Y copolymer, and E is the remainder weight percent and preferably comprises 40-90 weight percent of the E/X/Y copolymer.

It is preferred that the functionalized toughener contain a minimum of about 0.5, more preferably 1.0, very preferably about 2.5 weight percent of repeat units and/or grafted molecules containing functional groups or carboxylate salts (including the metal), and a maximum of about 15, more preferably about 13, and very preferably about 10 weight percent of monomers containing functional groups or carboxylate salts (including the metal). It is to be understood than any preferred minimum amount may be combined with any preferred maximum amount to form a preferred range. There may be more than one type of functional monomer present in the polymeric toughener, and/or more than one polymeric toughener. In one embodiment the polymeric toughener comprises about 2.5 to about 10 weight percent of repeat units and/or grafted molecules containing functional groups or carboxylate salts (including the metal).

It has been found that often the toughness of the composition is increased by increasing the amount of functionalized toughener and/or the amount of functional groups and/or metal carboxylate groups. However, these amounts should preferably not be increased to the point that the composition may crosslink (thermoset), especially before the final part shape is attained, and/or the first to melt tougheners may crosslink each other. Increasing these amounts may also increase the melt viscosity, and the melt viscosity should also preferably not be increased so much that molding is made difficult.

Nonfunctionalized tougheners may also be present in addition to a functionalized toughener. Nonfunctionalized tougheners include polymers such as ethylene/α-olefin/diene (EPDM) rubber, polyolefins including polyethylene (PE) and polypropylene, and ethylene/α-olefin (EP) rubbers such as ethylene/1-octene copolymer, and the like such as those commercial copolymers under the ENGAGE® brand from Dow Chemical, Midland Mich. Other nonfunctional tougheners include the styrene-containing polymers including acrylonitrile-styrene copolymer, acrylonitrile-butadiene-styrene copolymer, styrene-isoprene-styrene copolymer, styrene-hydrogenated isoprene-styrene copolymer, styrene-butadiene-styrene copolymer, styrene-hydrogenated butadiene-styrene copolymer, styrenic block copolymer and polystyrene. For example, acrylonitrile-butadiene-styrene, or ABS, is a terpolymer made by polymerizing styrene and acrylonitrile in the presence of polybutadiene. The proportions can vary from 15 to 35% acrylonitrile, 5 to 30% butadiene and 40 to 60% styrene. The result is a long chain of polybutadiene criss-crossed with shorter chains of poly (styrene acrylonitrile).

Other polymeric tougheners useful in the invention are having a (vinyl aromatic comonomer) core comprising an ethylene copolymer as disclosed above, the core optionally cross-linked and optionally containing a vinyl aromatic comonomer, for instance styrene; and a shell comprising another polymer that may include polymethyl methacrylate and optionally contain functional groups including epoxy, or amine. The core-shell polymer may be made up of multiple layers, prepared by a multi-stage, sequential polymerization technique of the type described in U.S. Pat. No. 4,180,529. Each successive stage is polymerized in the presence of the previously polymerized stages. Thus, each layer is polymerized as a layer on top of the immediately preceding stage.

When used, the minimum amount of polymeric toughener is 0.5, preferably 2, and more preferably 6 weight percent of the melt-blended thermoplastic composition, while the maximum amount of polymeric toughener is 20 weight percent, preferably 14 weight percent. It is to be understood than any minimum amount may be combined with any maximum amount to form a preferred weight range.

Useful polymeric tougheners include:

(a) A copolymer of ethylene, glycidyl (meth)acrylate, and optionally one or more (meth)acrylate esters.

(b) An ethylene/α-olefin or ethylene/α-olefin/diene (EPDM) copolymer grafted with an unsaturated carboxylic anhydride such as maleic anhydride.

(c) A copolymer of ethylene, 2-isocyanatoethyl (meth)acrylate, and optionally one or more (meth)acrylate esters.

(d) a copolymer of ethylene and acrylic acid reacted with a Zn, Li, Mg or Mn compound to form the corresponding ionomer.

Figure 2:
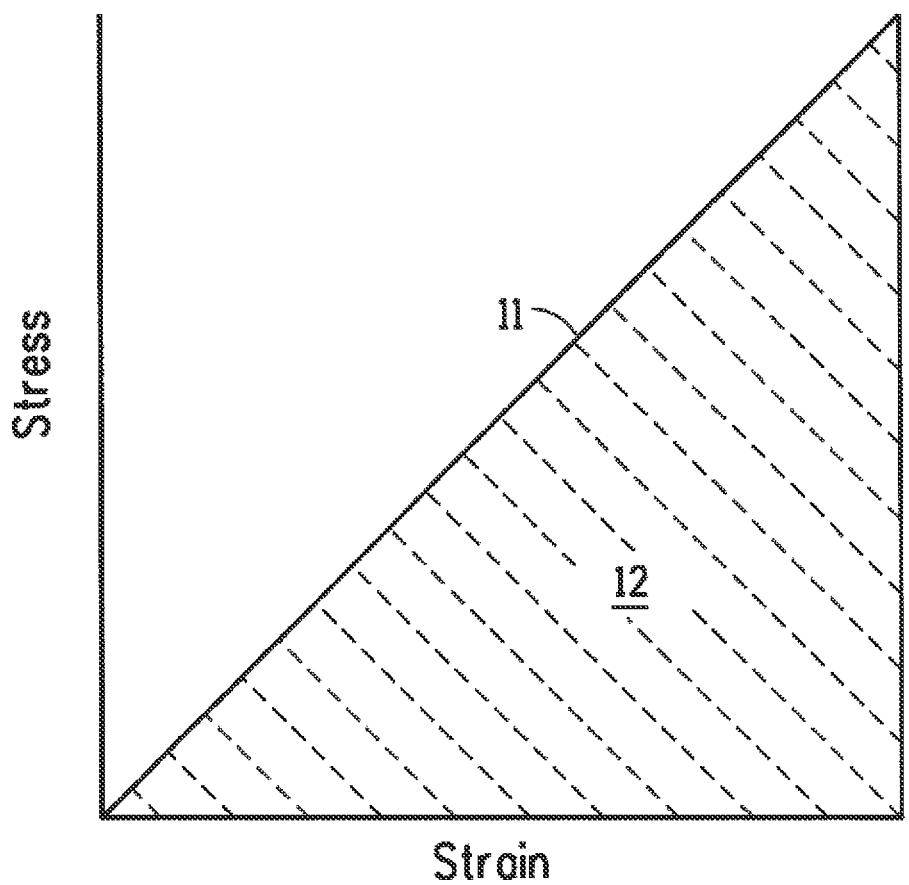
FIG. 2 illustrates an idealized stress-strain curve.

Elongation is a key indicator for material toughness. Toughness is a measure of the energy a sample can absorb before it breaks. FIG. 2 shows an idealized stress-strain curve (11). The energy absorption is characterized by an area under stress-strain curve (12) in tensile testing. When comparing materials of similar tensile strength, the higher the elongation at break, the higher is the energy absorption and the higher is the toughness.

Another embodiment is a composite wheel comprising a polyamide composition wherein 4 mm test bars prepared from said polyamide composition have an average tensile modulus greater than or equal to about 8.5 GPa, and preferably 10.0 GPa, as measured by ISO 527-1/2 and an elongation at break of at least 4% as tested according to ISO 527-2/1A.

The thermoplastic composition may include a thermal stabilizer selected from the group consisting of polyhydric alcohols having more than two hydroxyl groups and having a number average molecular weight ($M_n$) of less than 2000; one or more polyhydroxy polymer(s) having a number average molecular weight of at least 2000 and selected from the group consisting of ethylene/vinyl alcohol copolymer and polyvinyl alcohol; stabilizer(s) selected from the group consisting of secondary aryl amines and hindered amine light stabilizers (HALS), and mixtures thereof; copper salts; and mixtures thereof.

The thermoplastic composition may comprise 0 to 10 weight percent, and preferably 0.1 to 10 weight percent, of one or more polyhydric alcohols having more than two hydroxyl groups and having a number average molecular weight ($M_n$) of less than 2000 of less than 2000 as determined for polymeric materials with gel permeation chromatography (GPC)

Polyhydric alcohols may be selected from aliphatic hydroxylic compounds containing more than two hydroxyl groups, aliphatic-cycloaliphatic compounds containing more than two hydroxyl groups, cycloaliphatic compounds containing more than two hydroxyl groups, aromatic and saccharides.

Preferred polyhydric alcohols include those having a pair of hydroxyl groups which are attached to respective carbon atoms which are separated one from another by at least one atom. Especially preferred polyhydric alcohols are those in which a pair of hydroxyl groups is attached to respective carbon atoms which are separated one from another by a single carbon atom.

Preferably, the polyhydric alcohol used in the thermoplastic composition is pentaerythritol, dipentaerythritol, tripentaerythritol, di-trimethylolpropane, D-mannitol, D-sorbitol and xylitol. More preferably, the polyhydric alcohol used is dipentaerythritol and/or tripentaerythritol. A most preferred polyhydric alcohol is dipentaerythritol.

In various embodiments the content of said polyhydric alcohol in the to thermoplastic composition is 0.25 to 10 weight percent, preferably 0.25 to 8 weight percent, and more preferably 0.25 to 5, and 1 to 4 weight percent.

The thermoplastic composition may comprise 0.1 to 10 weight percent of at least one polyhydroxy polymer having a number average molecular weight ($M_n$) of at least 2000, selected from the group consisting of ethylene/vinyl alcohol copolymer and poly(vinyl alcohol); as determined for polymeric materials with gel permeation chromatography (GPC). Preferably the polyhydroxy polymer has a $M_n$ of 5000 to 50,000.

In one embodiment the polyhydroxy polymer is an ethylene/vinyl alcohol copolymer (EVOH). The EVOH may have a vinyl alcohol repeat content of 10 to 90 mol % and preferably 30 to 80 mol %, 40 to 75 mol %, 50 to 75 mol %, and 50 to 60 mol %, wherein the remainder mol % is ethylene. A suitable EVOH for the thermoplastic composition is Soarnol® A or D copolymer available from Nippon Gosei (Tokyo, Japan) and EVAL® copolymers available from Kuraray, Tokyo, Japan.

In one embodiment the polyhydroxy polymer is a poly (vinyl alcohol) polymer (PVOH). Suitable PVOH polymers for the thermoplastic composition are the Mowiol® brand resins available from Kuraray Europe Gmbh.

The thermoplastic composition may comprise 1 to 10 weight percent; and preferably 1 to 7 weight percent and more preferably 2 to 7 weight percent polyhydroxy polymer based on the total weight of the thermoplastic polyamide composition.

The thermoplastic composition may comprise about 0.1 to at or about 1 weight percent, or more preferably from at or about 0.1 to at or about 0.7 weight percent, based on the total weight of the polyamide composition, of a secondary aryl amine. Secondary aryl amities useful in the invention are high molecular weight organic compound having low volatility. Preferably, the high molecular weight organic compound will be selected from the group consisting of secondary aryl amines further characterized as having a molecular weight of at least 260 g/mol and preferably at least 350 g/mol, together with a 10% weight loss temperature as determined by thermogravimetric analysis (TGA) of at least 290° C., preferably at least 300° C., 320° C., 340° C., and most preferably at least 350° C.

By secondary aryl amine is meant an amine compound that contains it) two carbon radicals chemically bound to a nitrogen atom where at least one, and preferably both carbon radicals, are aromatic. Preferably, at least one of the aromatic radicals, such as, for example, a phenyl, naphthyl or heteroaromatic group, is substituted with at least one substituent, preferably containing 1 to about 20 carbon atoms.

Examples of suitable secondary aryl amines include 4,4'di (α,α-dimethylbenzyl)diphenylamine available commercially as Naugard 445 from Uniroyal Chemical Company, Middlebury, Conn.; the secondary aryl amine condensation product of the reaction of diphenylamine with acetone, available commercially as Aminox from Uniroyal Chemical Company; and para-(paratoluenesulfonylamido) diphenylamine also available from Uniroyal Chemical Company as Naugard SA. Other suitable secondary aryl amines include N,N'-di-(2-naphthyl)-p-phenylenediamine, available from ICI Rubber Chemicals, Calcutta, India. Other suitable secondary aryl amines include 4,4'-bis(α,α'-tertiaryoctyl)diphenylamine, 4,4'-bis(α-methylbenzhydryl)diphenylamine, and others from EP 0509282 B1.

The hindered amine light stabilizers (HALS) may be one or more hindered amine type light stabilizers (HALS), HALS are compounds of the following general formulas and combinations thereof:

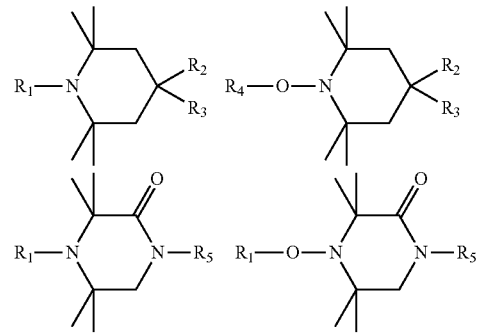

In these formulas, $R_1$ up to and including $R_5$ are independent substituents. Examples of suitable substituents are hydrogen, ether groups, ester groups, amine groups, amide groups, alkyl groups, alkenyl groups, alkynyl groups, aralkyl groups, cycloalkyl groups and aryl groups, in which the substituents in turn may contain functional groups; examples of functional groups are alcohols, ketones, anhydrides, imines, siloxanes, ethers, carboxyl groups, aldehydes, esters, amides, imides, amines, nitriles, ethers, urethanes and any combination thereof. A hindered amine light stabilizer may also form part of a polymer or oligomer.

Preferably, the HALS is a compound derived from a substituted piperidine compound, in particular any compound derived from an alkyl-substituted piperidyl, piperidinyl or piperazinone compound, and substituted alkoxypiperidinyl compounds. Examples of such compounds are: 2,2,6,6-tetramethyl-4-piperidone; 2,2,6,6-tetramethyl-4-piperidinol; bis-(1,2,2,6,6-pentamethyl piperidyl)-(3',5'-di-tert-butyl-4'-hydroxybenzyl) butylmalonate; di-(2,2,6,6-tetramethyl-4-piperidyl) sebacate (Tinuvin® 770, MW 481); oligomer of N-(2-hydroxyethyl)-2,2,6,6-tetramethyl-4-piperidinol and succinic acid (Tinuvin® 622); oligomer of cyanuric acid and N,N-di(2,2,6,6-tetramethyl-4-piperidyl)-hexamethylene diamine; bis-(2,2,6,6-tetramethyl-4-piperidinyl) succinate; bis-(1-octyloxy-2,2,6,6-tetramethyl-4-piperidinyl) sebacate (Tinuvin® 123); bis-(1,2,2,6,6- pentamethyl-4-piperidinyl) sebacate (Tinuvin® 765); Tinuvin® 144; Tinuvin® XT850; tetrakis-(2,2,6,6-tetramethyl-4-piperidyl)-1,2,3,4-butane tetracarboxylate; N,N'-bis-(2,2,6,6-tetramethyl-4-piperidyl)-hexane-1,6-diamine (Chimasorb® T5); N-butyl-2,2,6,6-tetramethyl-4-piperidinamine; 2,2'-[(2,2,6,6-tetramethyl-piperidinyl)-imino]-bis[ethanol]; poly((6-morpholine-S-triazine-2,4-diyl)(2,2,6,6-tetramethyl-4-piperidinyl)-iminohexamethylene-(2,2,6,6-tetramethyl-4-piperidinyl)-imino) (Cyasorb® UV 3346); 5-(2,2,6,6-tetramethyl-4-piperidinyl)-2-cyclo-undecyl-oxazole) (Hostavin® N20); 1,1'-(1,2-ethane-di-yl)-bis-(3,3',5,5'-tetramethyl-piperazinone); 8-acetyl-3-dothecyl-7,7,9,9-tetramethyl-1,3,8-triazaspiro(4,5)decane-2,4-diene; polymethylpropyl-3-oxy-[4(2,2,6,6-tetramethyl)-piperidinyl]siloxane (Uvasil® 299); 1,2,3,4-butane-tetracarboxylic acid-1,2,3-tris(1,2,2,6,6-pentamethyl-4-piperidinyl)-4-tridecylester; copolymer of alpha-methylstyrene-N-(2,2,6,6-tetramethyl-4-piperidinyl) maleimide and N-stearyl maleimide; 1,2,3,4-butanetetracarboxylic acid, polymer with beta,beta,beta',beta'-tetramethyl-2,4,8,10-tetraoxaspiro[5.5]undecane-3,9-diethanol, 1,2,2,6,6-pentamethyl-4-piperidinyl ester (Mark® LA63); 2,4,8,10-tetraoxaspiro[5.5]undecane-3,9-diethanol,beta,beta,beta',beta'-tetramethyl-polymer with 1,2,3,4-butanetetracarboxylic acid, 2,2,6,6-tetramethyl-4-piperidinyl ester (Mark® LA68); D-glucitol, 1,3:2,4-bis-O-(2,2,6,6-tetramethyl-4-piperidinylidene)- (HALS 7); oligomer of 7-oxa-3,20-diazadispiro[5.1.11.2]-heneicosan-21-one-2,2,4,4-tetramethyl-20-(oxiranylmethyl) (Hostavin® N30); propanedioic acid, [(4-methoxyphenyl)methylene]-, bis(1,2,2,6,6-pentamethyl-4-piperidinyl) ester (Sanduvor® PR 31); formamide, N,N'-1,6-hexanediylbis[N-(2,2,6,6-tetramethyl-4-piperidinyl (Uvinul® 4050H); 1,3,5-triazine-2,4,6-triamine, N,N'''[1,2-ethanediylbis [[[4,6-bis[butyl(1,2,2,6,6-pentamethyl-4-piperidinyl)amino]-1,3,5-triazine-2-yl]imino]-3,1-propanediyl]]bis[N',N''-dibutyl-N',N''-bis(1,2,2,6,6-pentamethyl-4-piperidinyl) (Chimassorb® 119 MW 2286); poly[[6-[(1,1,3,33-tetramethylbutyl)amino]-1,3,5-triazine-2,4-diyl][(2,2,6,6-tetramethyl-4-peperidinyl)-imino]-1,6-hexanediyl[(2,2,6,6-tetramethyl-4-piperidinyl)imino]] (Chimassorb® 944 MW 2000-3000); 1,5-dioxaspiro (5,5) undecane 3,3-dicarboxylic acid, bis(2,2,6,6-tetramethyl-4-peridinyl) ester (Cyasorb® UV-500); 1,5-dioxaspiro (5,5) undecane 3,3-dicarboxylic acid, bis(1,2,2,6,6-pentamethyl-4-peridinyl) ester (Cyasorb® UV-516); N-2,2,6,6-tetramethyl-4-piperidinyl-N-amino-oxamide; 4-acryloyloxy-1,2,2,6,6-pentamethyl-4-piperidine 1,5,8,12-tetrakis[2',4'-bis(1",2",2",6",6"-pentamethyl-4"-piperidinyl (butyl)amino)-1',3',5'-triazine-6'-yl]-1,5,8,12-tetraazadodecane; HALS PB-41 (Clariant Huningue S. A.); Nylostab® S-EED (Clariant Huningue S. A.); 3-dodecyl-1-(2,2,6,6-tetramethyl-4-piperidyl)-pyrrolidin-2,5-dione; Uvasorb® HA88; 1,1'-(1,2-ethane-di-yl)-bis-(3,3',5,5'-tetra-methyl-piperazinone) (Good-rite® 3034); 1,1'1"-(1,3,5-triazine-2,4,6-triyltris((cyclohexylimino)-2,1-ethanediyl)tris(3,3,5,5-tetramethylpiperazinone) (Good-Rite® 3150) and; 1,1'1"-(1,3,5-triazine-2,4,6-triyitris((cyclohexylimino)-2,1-ethanediyl)tris(3,3,4,5,5-tetramethylpiperazinone) (Good-rite® 3159). (Tinuvin® and Chimassorb® materials are available from Ciba Specialty Chemicals; Cyasorb® materials are available from Cytec Technology Corp.; Uvasil® materials are available from Great Lakes Chemical Corp.; Saduvor®, Hostavin®, and Nylostab® materials are available from Clariant Corp.; Uvinul® materials are available from BASF; Uvasorb® materials are available from Partecipazioni Industriali; and Good-Rite® materials are available from B.F. Goodrich Co. Mark® materials are available from Asahi Denka Co.)

Other specific HALS are selected from the group consisting or di-(2,2,6,6-tetramethyl-4-piperidyl)sebacate (Tinuvin® 770, MW 481) Nylostab® S-EED (Clariant Huningue S. A.); 1,3,5-triazine-2,4,6-triamine, N,N'''-[1,2-ethanediylbis [[[4,6-bis[butyl(1,2,2,6,6-pentamethyl-4-piperidinyl)amino]-1,3,5-triazine-2-yl]imino]-3,1-propanediyl]]bis[N',N''-dibutyl-N',N''-bis(1,2,2,6,6-pentamethyl-4-piperidinyl) (Chimassorb® 119 MW 2286); and poly[[6-[(1,1,3,33-tetramethylbutyl)amino]-1,3,5-triazine-2,4-diyl][(2,2,6,6-tetramethyl-4-peperidinyl)-imino]-1,6-hexanediyl [(2,2,6,6-tetramethyl-4-piperidinyl)imino]] (Chimassorb® 944 MW 2000-3000).

Mixtures of secondary aryl amines and HALS may be used. A preferred embodiment comprises at least two co-stabilizers, at least one selected from the secondary aryl amines; and at least one selected from the group of HALS, as disclosed above, wherein the total weight percent of the mixture of co-stabilizers is at least 0.5 wt percent, and preferably at least 0.9 weight percent.

Mixtures of polyhydric alcohols, secondary aryl amines, and HALS may be used. A preferred embodiment includes at least one polyhydric alcohol and at least one secondary aryl amine.

The thermoplastic composition may comprise about 0.1 to at or about 1 weight percent, or more preferably from at or about 0.1 to at or about 0.7 weight percent, based on the total weight of the polyamide composition, of copper salts, Copper halides are mainly used, for example CuI, CuBr, Cu acetate and Cu naphthenate. Cu halides in combination with alkali halides such as KI, KBr or LiBr may be used. Copper salts in combination with at least one other stabilizer selected from the group consisting of poyhydric alcohols, polyhric polymers, secondary aryl amines and HALS; as disclosed above, may be used as thermal stabilizers.

The thermoplastic composition may optionally comprise additional additives such as plasticizers, colorants; lubricants; mold release agents; and the like. Such additives can be added according to the desired properties of the resulting material, and the control of these amounts versus the desired properties is within the knowledge of the skilled artisan.

Herein the thermoplastic composition is a mixture by melt-blending, in which all polymeric ingredients are adequately mixed, and all non-polymeric ingredients are adequately dispersed in a polymer matrix. Any melt-blending method may be used for mixing polymeric ingredients and non-polymeric ingredients of the present invention. For example, polymeric ingredients and non-polymeric ingredients may be fed into a melt mixer, such as single screw extruder or twin screw extruder, agitator, single screw or twin screw kneader, or Banbury mixer, and the addition step may be addition of all ingredients at once or gradual addition in batches. When the polymeric ingredient and non-polymeric ingredient are gradually added in batches, a part of the polymeric ingredients and/or non-polymeric ingredients is first added, and then is melt-mixed with the remaining polymeric ingredients and non-polymeric ingredients that are subsequently added, until an adequately mixed composition is obtained.

Another embodiment is a composite wheel of any of the above embodiments; wherein rectangular test pieces measuring 50 mm×12 mm×3.2 mm, prepared from said polyamide resin, have a resistance to 50% by weight aqueous solution of $ZnCl_2$ of at least 24 hours at 50° C., when measured according to ASTM D1693, Condition A, adapted for determining stress cracking resistance of the polyamide compositions as disclosed herein.

The present invention is further illustrated by the following examples. It should be understood that the following examples are for illustration purposes only, and are not used to limit the present invention thereto.

Methods

% Biobased Carbon

ASTM-D6866 Method B Biobased Determination method were conducted by Beta Analytics Inc. Miami Fla., USA, to determine the % biobased carbon.

Data in Tables 1 and 4 were Obtained Using the Following Methods:

Melting Points

Melting points and glass transition temperatures were measured on a TA Instruments DSC 2910 using ASTM Method ASTM D3418 at a heating rate of 10° C./min. On the second heat the melting point is taken as the peak of the melting endotherm, and the glass transition temperature is taken at the transition midpoint.

Melt Viscosity

Melt viscosity was measured on a Dynisco LCR 7001 at 280 C and 1000 sec-1 shear rate.

Physical Properties Measurement

Mechanical tensile properties: Tensile strength (TS, stress at break) and elongation at break (EB, strain at break) were measured according to ISO 527-2/1A. Measurements were made on injection molded ISO tensile bar with melt temperature at 295-300° C.; mold temperature at 100° C. and a hold pressure of 85 MPa, with a thickness of the test specimen of 4 mm and a width of 10 mm according to ISO 527/1A at a testing speed of 5 mm/min (tensile strength and elongation) and 50 mm/min for unreinforced samples. Flexural modulus and flexural strength were measured per ISO 178. Notched Charpy was measured per ISO 179.

Data in Tables 2 and 3 were Obtained Using the Following Methods:

Melting Point

Herein melting points were as determined with DSC at a scan rate of 10° C./min in the first heating scan, wherein the melting point is taken at the maximum of the endothermic peak.

Freezing Point

Herein freezing points were as determined with DSC at a scan rate of 10° C./min in the cooling cycle as per ASTM D3418.

Inherent Viscosity

Inherent viscosity (IV) was measured on a 0.5% solution of copolyamide in m-cresol at 25° C.

Polyamides obtained from single preparation batches or multiple preparation batches (2 to 3 batches) were cube blended, dried and then injection molded into test bars. The tensile and flexural properties listed in Table 2 were measured as per ASTM D638 and ASTM D790 test procedures, respectively. Yield stress and Young's modulus were measured using 115 mm (4.5 in) long and 3.2 mm (0.13 in) thick type IV tensile bars per ASTM D638-02a test procedure with a crosshead speed of 50 mm/min (2 in/min). Flexural modulus was measured using 3.2 mm (0.13 in) thick test pieces per ASTM D790 test procedure with a 50 mm (2 in) span, 5 mm (0.2 in) load and support nose radii and 1.3 mm/min (0.05 in/min) crosshead speed.

DMA Test Method

Dynamic mechanical analysis (DMA) test was done using TA instruments DMA Q800 equipment. Injection molded test bars nominally measuring 18 mm×12.5 mm×3.2 mm were used in single cantilever mode by clamping their one end. The bars were equilibrated to −140° C. for 3 to 5 minutes, and then DMA test was carried out with following conditions: temperature ramping up from −140° C. to +150° C. at a rate of 2 degrees C./min, sinusoidal mechanical vibration imposed at an amplitude of 20 micrometers and multiple frequencies of 100, 50, 20, 10, 5, 3 and 1 Hz with response at 1 Hz selected for determination of storage modulus (E') and loss modulus (E") as a function of temperature. Tan delta was computed by dividing the loss modulus (E") by the storage modulus (E').

Zinc Chloride Resistance Test

ASTM D1693, Condition A, provides a test method for determination of environmental stress-cracking of ethylene plastics in presence of surface active agents such as soaps, oils, detergents etc. This procedure was adapted for determining stress cracking resistance of the polyimide compositions to a 50% by weight aqueous solution of ZnCl2 as follows.

Rectangular test pieces measuring 37.5 mm×12 mm×3.2 mm were molded. A controlled nick was cut into the face of each molded bar as per the standard procedure, the bars were bent into U-shape with the nick facing outward, and positioned into brass specimen holders as per the standard procedure. At least five bars were used for each composition. The holders were positioned into large test tubes.

The test fluid used was 50 wt % zinc chloride solution prepared by dissolving anhydrous zinc chloride into water in 50:50 weight ratio. The test tubes containing specimen holders were filled with freshly prepared salt solution fully immersing the test pieces such that there was at least 12 mm of fluid above the top test piece. The test tubes were positioned upright in a circulating air oven maintained at 50° C. Test pieces were periodically examined for development of cracks over a period of continued immersion of up to about 200 hours as indicated in the tables below. Time to first observation of failure in any of the test pieces was recorded. After about 200 hours of continued immersion, test pieces were withdrawn from the zinc chloride solution and without wiping, dried in an oven at 50° C. for another 24 hours. Time to first observation of failure in any of the test pieces was recorded.

Test Methods Used in Table 5 and 6

Tensile strength, elongation at break, and tensile modulus were tested on a tensile tester from Instru-Met Corporation by ISO 527-1/2 at 23° C. and strain rate of 5 mm/min on samples that were dry as molded.

Notched Izod was tested on a CEAST Impact Tester by ISO 180 at 23° C. on a Type 1A multipurpose specimen with the end tabs cut off. The resulting test sample measures 80×10×4 mm. (The depth under the notch of the specimen is 8 mm). Specimens were dry as molded.

Un-notched Izod was tested on a CEAST Impact Tester by ISO 180 at 23° C. on a Type 1A multipurpose specimen with the end tabs cut off. The resulting test sample measures 80×10×4 mm. Specimen were dry as molded.

Test Methods Used in Table 7

FIG. 3 illustrates a cross-sectional view of a wheel test specimen useful in an upward and downward (throw-down) impact test. The wheel test specimen was a tub (1) nominally about 10 inches in diameter by 4 inches deep, with a flange (2) approximately 0.75 inches in annular width, projecting outwardly at about a 90 degree angle from the tub wall (3), running around the open end of the tub.

The tubs were injection molded using the following procedure: pelletized compositions were dried in a desiccant (dew point of −40° F.) dryer at 180° F. for 5 hours and were then fed into a 500 Ton Van Dorn injection molding machine and were processed using a general purpose screw at a melt temperature of about 580 to 590° F., and a mold temperature of 285° F., with core temperatures of 310° F. The thickness of the tub was about 0.200 to 0.250 inches. The molded components were allowed to rest 10 to 12 hours to cool and relax stress due to the molding process.

Upward Vertical Impact Test

The tub was taken in hand grasping the flange such that the fingers wrap onto the inner surface of the tub and the palm of the hand rests on the outside wall of the tub. Holding the tub firmly, the tub was swung back by the arm approximately 45 degrees, and then thrown in the air to at least 25 feet to about 30 feet, as nearly vertical as possible, attempting to cause the tub to rotate about its axis, and allowing the tub to fall onto a level open area, paved with concrete. The tub was inspected for cracks. The number of times the tub was thrown to provide a crack by visual inspection was recorded. The averaged number of times the tub was thrown to provide a crack by visual inspection was recorded from 4 or 5 test specimens.

Downward Impact Test

An operator grasped the tub as disclosed above, took a small step back with the foot on the same side as the hand holding the tub, and swung the tub back and 360 degrees around and threw overhand onto a level open area, paved with concrete, at as dose to vertical to the concrete as possible. The tub was inspected for cracks. The averaged number of times the tub was thrown to provide a crack by visual inspection is recorded from 4 or 5 test specimens.

The tub was considered of marginal performance if there were cracks evident after 2 cycles, and acceptable performance was no cracks after 4 cycles through each procedure. Highly desirable performance was no cracks after 10 cycles through each procedure. Tubs showing no cracks after 10 cycles indicate the material comprising the tub was appropriate for use in demanding dynamic structural applications such as ATV wheels.

Materials

Hydrotreating of Coconut Oil to Provide C12 and C14 Linear Alkane Mixture:

International Publication WO 2010/068904, Example 10 provides the procedure for production of purified C12 and C14 linear alkanes from Coconut oil.

Fermentation of Dodecane to Dodecanedioic Acid:

International Publication WO 2010/068904, Example 10 provides the procedure for production of purified dodecanedioic acid.

Production of a mixture of dodecanedioic acid and tetradecanedioic acid from a mixture of the corresponding chain length, C12 and C14, alkanes by *Candida maltosa* ATCC 74430 (prophetic):

A 10 ml, seed inoculum of *Candida maltosa* strain ATCC 74430 is grown for 24 h at 30° C. with shaking at 250 rpm in a solution containing 10 g/L yeast extract+20 g/L peptone+20 g/L glucose. The resulting cell suspension is inoculated into 2×350 mL of pH 5 yeast minimal medium consisting of 3 g/L (NH4)2SO4, 6.6 g/L KH2PO4, 0.4 g/L K2HPO4, 0.6 g/L anhydrous MgSO4, 4 g/L yeast extract, 75 g/L glucose, 100 mg/l, biotin, 13 mg/l, FeSO4-7H2O, 2 mg/L CuSO4-51-120, 20 mg/L ZnSO4-7H2O, 6 mg/L MnSO4-H20, 2 mg/L Co(NO3)2.6H2O, 3 mg/L NaMo04-2H2O and 1.6 mg/L KI and grown for 24 h at 30° C. with shaking at 250 rpm. A fermenter (Braun) containing 7 L of pH 5 yeast minimal medium is then inoculated with 525 mL of the overnight culture. The fermenter is maintained at minimal airflow and agitation until dissolved oxygen reaches 20% of atmospheric. The dissolved oxygen is then raised to approximately 80% of atmospheric and maintained through fermenter control of aeration up to 2 vvm and agitation up to 1400 rpm at 30° C. The addition of 10% w/v NH4OH provided nitrogen for cell growth and also maintained the pH of the medium at 5. After approximately 18 h, glucose concentration reaches approximately zero. The alkane mixture is then added to a final concentration of approximately 20 g/L. The pH of the medium is then adjusted to 7.5 through the addition of 20% w/v KOH.

Further additions of 20% w/v KOH maintain pH of the medium at 7.5 for the remainder of the fermentation. The alkane mixture is maintained above 3 g/L in the fermenter. In addition, glucose is fed at a slow rate in the range of 0.2 to 0.8 g glucose min and glucose concentration is monitored and addition rate is adjusted to keep the glucose concentration below 1 g glucose/L. Approximately 51 h after alkane addition, material from the fermenter is harvested and analyzed for concentrations of dicarboxylic acids.

The dicarboxylic acid mixture is recovered from the whole fermenter liquor (cells and supernatant) by acidifying the liquor to pH 2 with 2M to phosphoric acid and extracting the precipitated material into 3×5 mL, methyl-tertiary butyl ether. A portion of the ether extract is evaporated to dryness and the recovered dicarboxylic acid mixture is analyzed as a MSTFA (N-methyl-N-trimethylsilyltrifluoroacetamide) derivative and analyzed by gas chromatography by methods known in the art.

Material recovered from the fermentation consists of a mixed diacid product. The C12 diacid is present at 10 g/L or a total yield of 80 g from the fermenter. The C14 diacid product is present at 6 g/L or a total yield of 48 g from the fermenter.

The mixture of C12 and C14 dioic acids can be purified according to conventional methods and used in preparation of copolyamides as disclosed below.

Hydrotreating of Palm Oil to Provide a C16/C18 Linear Alkane Mixture:

Palm oil (50 g, manufactured by T.I. International Ghana Ltd. Of Accra, Ghana) was hydrotreated according to Example 2 of International Publication WO 2010/068904 to provide a mixture containing C14=1 wt %, C15=4 wt %, C16=43 wt %, C17=5 wt %, C18=46.5 wt %, and C18+=0.5 wt %, as determined by GC-FID analysis according to procedures outlined in the reference.

C16 Linear Alkane Separation:

The linear alkane mixture derived from palm oil is fed to a two column distillation train at 1000 g/hour. Both columns contain 25 equilibrium stages, a reboiler, a water cooled condenser, and a reflux splitter. The feed enters the center of the first column at 1000 g/hour, and the first column operates at a reflux ratio of 15:1, a head pressure of 10 mmHg, a reboiler pressure of 30 mmHg, a head temperature of 134.9° C. and a reboiler temperature of 184.3° C. Low boiling materials containing: C14=15.4 wt %, C15=58.9 wt %, and C16=25.7 wt % are collected overhead at 65 g/hour. High boiling materials containing: C15=0.2 wt %, C16=44.2 wt %, C17=5.4 wt %, C18=49.7 wt %, and C18+=0.5 wt % are taken from the reboiler of the first column at 935 g/hour and fed to the center of the second column. The second column operates at a 4:1 reflux ratio, a head pressure of 10 mmHg, a reboiler pressure of 30 mmHg, a head temperature of 148.8° C. and a reboiler temperature of 197.4° C. The product is taken off the top of the second to column at 400 g/hour and has the following composition: C15=0.4 wt %, C16=99.5 wt %, and C17=0.1 wt %. High boiling materials are taken from the reboiler of the second column at 535 g/hour and have the following composition: C16=2.9 wt %, C17=9.3 wt %, C18=86.9 wt % and C18+=0.9 wt %.

C18 Linear Alkane Separation:

The linear alkane mixture derived from palm oil is fed to a two column distillation train at 1000/hour. Both columns contain 25 equilibrium stages, a reboiler, a water cooled condenser, and a reflux splitter. The feed enters the center of the first column. The column operates at a reflux ratio of 4:1, a head pressure of 10 mmHg and a reboiler pressure of 30 mmHg. The head temperature is 147.3° C. and the reboiler temperature is 200.1° C. Low boiling materials containing: C14=1.9%, C15=7.6 wt %, C16=81.1 wt %, C17=9.2 wt %, and C18=0.2 wt % are taken overhead from the first column at 530 g/hour. High boiling materials containing: C17=0.2 wt %, C18=98.7 wt %, and C18+=1.1 wt % are taken from the reboiler of the first column at 470 g/hour and are introduced into the center of the second column. The second column operates at a reflux ratio of 3:1, a head pressure of 10 mmHg, a reboiler pressure of 30 mmHg, a head temperature of 173.8° C., and a reboiler temperature of 205.0° C. The C18 product is taken overhead from the second column at 460 g/hour and has the following composition: C17=0.2 wt %, C18=99.7 wt %, and C18+=0.1 wt %. High boiling materials are removed from the reboiler of the second column at 10 g/hour and have the following composition: C18=51.6 wt % and C18+=48.4 wt %.

Production of a mixture of hexadecanedioic acid and octadecanedioic acid from a mixture of the corresponding chain length, C16 and C18 linear alkanes, by *Candida tropicalis* CGMCC NO. 0206 (Center of General Microbiology of China Committee for Culture Collection of Microorganisms) (prophetic):

Microbial oxidation of a C16/C18 linear alkane mixture is performed according to the general procedures outlined in International Publication WO 2010/068904.

A seed culture of *Candida tropicalis* CGMCC 0206 is grown up in 25 ml to of alkane seed medium: tap water with KH2PO4, 8 g/L, yeast extract, 5 g/L, corn extract, 3 g/L, sucrose, 5 g/L, urea 3 g/L, n-hexadecane 70 ml/L, pH 5.0. Growth occurs at 30° C. on a rotating shaker at 220 rpm for 48 hours. This inoculum is transferred to 500 mL of the same medium and grown under the same conditions for an additional 24 hours.

From the seed growth 500 ml of the seed suspension is added to a 10 L fermenter containing 7 L of fermentation medium: KH2PO4, 8 g/L, corn extract, 1 g/L, NaCl, 1.5 g/L, urea, 1 g/L, C16/C18 (1:1 wt ratio) alkane mixture, 70 g/L, anti-foam, 500 ppm, KNO3 6 g/L, dissolved with tap water, pH 7.5 The fermentation is run at 30° C. with oxygen levels maintained at 20% of atmospheric for 4 days. A 20% aqueous NaOH solution is added periodically to adjust pH within 7.5-8. Further additions of 20% w/v aqueous KOH maintain pH of the medium at 7.5 for the remainder of the fermentation. The alkane mixture is maintained above 10 g/L in the fermenter by periodic additions The dicarboxylic acid mixture is recovered from the whole fermenter liquor (cells and supernatant) by acidifying the liquor to pH 2 with 2M phosphoric acid and extracting the precipitated material into 3×5 mL, methyl-tertiary butyl ether. A portion of the ether extract is evaporated to dryness and the recovered dicarboxylic acid mixture is analyzed as a MSTFA (N-methyl-N-trimethylsilyltrifluoroacetamide) derivative and analyzed by gas chromatography by methods known in the art.

Material recovered from the fermentation consists of a mixed diacid product. The C16 diacid is present at 25 g/L or a total yield of 200 g from the fermenter. The C18 diacid product is present at 20 g/L or a Natal yield of 160 g from the fermenter.

The mixture of C16 and C18 dioic acids can be purified according to conventional methods and used in preparation of copolyamides as disclosed below. Alternatively hexadecanedioic acid and octadecanedioic acid can be prepared separately by using C16 and C18 linear alkanes, respectively, in the same procedure as described above. The individual dioic acids, purified by crystallization can be mixed to provide a C16/C18 salt solution for copolyamide polymerization as described below.

The following polymers used in the invention were prepared by synthesis:

COMPARATIVE EXAMPLE C1

Synthesis of PA 612

Salt Preparation: Nylon 612 salt solution of approximately 40% by weight in water was prepared as follows: Dodecanedioic acid (53.2 lbs), an aqueous solution of about 80 wt % hexamethylene diamine (HMD) (26.8 lbs dry basis) and water (120 lbs) were added to a salt reactor. The salt solution was heated to 90° C. After complete dissolution, the salt solution was adjusted to a pH of 7.6±0.04. After adjusting to the aim pH, glacial acetic acid (56.3 g) and Carbowax 8000 (0.7 g) were added to the salt tank. The salt solution was then charged to the autoclave.

The autoclave agitator was set to 10 rpm. The agitator was maintained at 10 rpm, the pressure control valve was set to 265 psia, and the autoclave was heated. The pressure was allowed to rise to 265 psia at which point steam was vented to maintain the pressure at 265 psia. The temperature of the contents was allowed to rise to 248° C. and held for 60 minutes. The pressure was then reduced to about 13 psia over about 20 minutes. The autoclave was then pressurized with nitrogen and the molten polymer was extruded into strands, quenched with cold water and cut into pellets.

The co-polyamide obtained had an inherent viscosity (IV) of 1.028 dl/g. The polymer had a melting point of 218° C., as measured by DSC. A second batch of polymer was produced with this recipe and the two batches combined for subsequent testing listed in Table 1.

Synthesis of PA 612/614 (70/30)

Salt Preparation: PA 612/614 salt solution of approximately 40% by weight in water was prepared as follows: Dodecanedioic acid (34.1 lbs), tetradecanedioic acid (16.38 lbs), an aqueous solution containing about 80 weight % of hexamethylene diamine (HMD) (24.2 lbs dry basis) and water (120 lbs) were added to a salt reactor. The salt solution was heated to 90° C. After complete dissolution, the salt solution was adjusted to a pH of 7.6±0.04. After adjusting to the pH, glacial acetic acid (66.3 g) and Carbowax 8000 (0.7 g) were added to the salt tank. The salt solution was then charged to the autoclave.

The autoclave agitator was set to 10 rpm. The agitator was maintained at 10 rpm, the pressure control valve was set to 265 psia, and the autoclave was heated. The pressure was allowed to rise to 265 psia at which point steam was vented to maintain the pressure at 265 psia. The temperature of is the contents was allowed to reach to 248° C. and held for 60 minutes. The pressure was then reduced to about 13 psia over about 20 minutes. The autoclave was then pressurized with nitrogen and the molten polymer was extruded into strands after quenching with cold water and pelletized.

The co-polyamide obtained had an inherent viscosity (IV) of 0.96 dl/g. The polymer had a melting point of 206° C., as measured by DSC.

A second batch of polymer was made with this recipe and the two batches combined for subsequent testing listed in Table 1.

Synthesis of PA 612/614 (80/20)

Salt Preparation: PA 612/614 salt solution of approximately 40% by weight in water was prepared as follows: Dodecanedioic acid (39.3 lbs), tetradecanedioic acid (11.0 lbs), an aqueous solution containing ~80 weight % of hexamethylene diamine (HMD) (24.7 lbs dry basis) and water (120 lbs) were added to a salt reactor. The salt solution was heated to 90° C. After complete dissolution, the salt solution was adjusted to a pH of 7.6±0.04, After adjusting to the pH of 7.6, glacial acetic acid (66.3 g) and Carbowax 8000 (0.7 g) were added to the salt tank. The salt solution was then charged to the autoclave.

The autoclave agitator was set to 10 rpm. The agitator was maintained at 10 rpm, the pressure control valve was set to 265 psia, and the autoclave was heated. The pressure was allowed to rise to 265 psia at which point steam was vented to maintain the pressure at 265 psia. The temperature of the contents was allowed to rise to 248° C. and held for 60 minutes. The pressure was then reduced to about 13 psia over about 20 minutes. The autoclave was then pressurized with nitrogen and the molten polymer was extruded into strands, quenched with cold water and cut into pellets.

The co-polyamide obtained had an inherent viscosity (IV) of 0.98 dl/g. The polymer had a melting point of 209° C., as measured by DSC.

Synthesis of PA 612/614/616 (65/25/10)

Salt Preparation: Nylon 612/614/616 salt solution of approximately 40% by weight in water was prepared as follows: Dodecanedioic acid (31.28 lbs), tetradecanedioic acid (13.49 lbs), hexadecanedioic acid (6 lbs) an aqueous solution containing ~80 weight % of hexamethylene diamine (HMD) (24.2 lbs is dry basis) and water (120 lbs) were added to a salt reactor. The salt solution was heated to 90° C. After complete dissolution, the salt solution was adjusted to a pH of 7.6±0.04. After adjusting to pH of 7.6, glacial acetic acid (66.3 g) and Carbowax 8000 (0.7 g) were added to the salt tank. The salt solution was then charged to the autoclave.

The autoclave agitator was set to 10 rpm. The agitator was maintained at 10 rpm, the pressure control valve was set to 265 psia, and the autoclave was heated. The pressure was allowed to rise to 265 psia at which point steam was vented to maintain the pressure at 265 psia. The temperature of the contents was allowed to rise to 248° C. and held for 60 minutes. The pressure was then reduced to about 13 psia over about 20 minutes. The autoclave was then pressurized with nitrogen and the molten polymer was extruded into strands, quenched with cold water and cut into pellets.

The ter-polyamide obtained had an inherent viscosity (IV) of 0.93 dl/g. The polymer had a melting point of 202° C., as measured by DSC. A second batch of polymer was made with this recipe and the two batches combined for subsequent testing listed in Table 1.

Synthesis of PA 612/614/616 (60/25/15)

Salt Preparation: Nylon 612/614/616 salt solution of approximately 40% by weight in water was prepared as follows: Dodecanedioic acid (28.65 lbs), tetradecanedioic acid (13.39 lbs), hexadecanedioic acid (8.9 lbs) an aqueous solution containing about 80 weight % of hexamethylene diamine (HMD) (24.1 lbs dry basis) and water (120 lbs) were added to a salt reactor. The salt solution was heated to 90° C. After complete dissolution, the salt solution was adjusted to a pH of 7.6±0.04. After adjusting to pH of 7.6, glacial acetic acid (56.1 g) and Carbowax 8000 (0.7 g) were added to the salt tank. The salt solution was then charged to the autoclave.

The autoclave agitator was set to 10 rpm. The agitator was maintained at 10 rpm, the pressure control valve was set to 265 psia, and the autoclave was heated. The pressure was allowed to rise to 265 psia at which point steam was vented to maintain the pressure at 265 psia. The temperature of the contents was allowed to rise to 248° C. and held for 60 minutes. The pressure was then reduced to about 13 psia over about 20 minutes. The autoclave was then pressurized with nitrogen and the molten polymer was extruded into strands, quenched with cold water and cut into pellets.

The ter-polyamide obtained had an inherent viscosity (IV) of 0.91 dl/g. The polymer had a melting point of 198° C., as measured by DSC.

Synthesis of PA 612/614/616 (65/20/15)

Salt Preparation: PA 6121614/616 salt solution of approximately 40% by weight in water was prepared as follows: Dodecanedioic acid (31.16 lbs), tetradecanedioic acid (10.75 lbs), hexadecanedioic acid (8.93 lbs) an aqueous solution containing about 80 weight % of hexamethylene diamine (HMD) (24.1 lbs dry basis) and water (120 lbs) were added to a salt reactor. The salt solution was heated to 90° C. After complete dissolution, the salt solution was adjusted to a pH of 7.6±0.04. After adjusting to pH of 7.6, glacial acetic acid (56.1 g) and Carbowax 8000 (0.7 g) were added to the salt tank. The salt solution was then charged to the autoclave.

The autoclave agitator was set to 10 rpm. The agitator was maintained at 10 rpm, the pressure control valve was set to 265 psia, and the autoclave was heated. The pressure was allowed to rise to 265 psia at which point steam was vented to maintain the pressure at 265 psia. The temperature of the contents was allowed to rise to 248° C. and held for 60 minutes. The pressure was then reduced to about 13 psia over about 20 minutes. The autoclave was then pressurized with nitrogen and the molten polymer was extruded into strands, quenched with cold water and cut into pellets.

The terpolyamide obtained had an inherent viscosity (IV) of 0.92 dl/g. The polymer had a melting point of 201° C., as measured by DSC.

TABLE 1

Properties of Polymers used in Examples and Comparative Examples

| Polymer | PA 612 | PA612/614 (70/30) | PA612/614 (80/20) | PA612/614/616 (65/25/10) | PA612/614/616 (60/25/15) | PA612/614/616 (65/20/15) |
|---|---|---|---|---|---|---|
| DSC data | | | | | | |
| Melting point (° C.) | 218 | 206 | 209 | 202 | 198 | 201 |
| Freezing point (° C.) | 188 | 176 | 179 | 170 | 168 | 169 |
| Tg (° C.) | 44 | 34 | 40 | 37 | 30 | 33 |
| Properties | | | | | | |
| MV (Poise) | 31 | 32 | 29 | 24 | 17 | 20 |
| TS, 23° C. (MPa) | 63 | 49 | 40 | 46 | 34 | 43 |
| Flex mod (MPa) | 2400 | 2050 | 2060 | 1950 | 1840 | 1940 |
| N-charpy, 23° C. (KJ/m2) | 3.2 | 4.3 | 4.2 | 4.3 | 4.4 | 3.8 |

Synthesis of PA 614

Salt Preparation: A 10 L autoclave was charged with tetradecanedioic acid (2690 g), an aqueous solution containing 78.4 weight % of hexamethylene diamine (HMD) (1554 g), an aqueous solution containing 28 weight percent acetic acid (30 g), an aqueous solution containing 1 weight percent sodium hypophosphite (35 g), an aqueous solution containing 1 weight percent Carbowax 8000 (10 g), and water (2260 g).

Process Conditions The autoclave agitator was set to 5 rpm and the contents were purged with nitrogen at 10 psi for 10 minutes. The agitator was then set to 50 rpm, the pressure control valve was set to 1.72 MPa (250 psi), and the autoclave was heated. The pressure was allowed to rise to 1.72 MPa at which point steam was vented to maintain the pressure at 1.72 MPa, The temperature of the contents was allowed to rise to 240° C. The pressure was then reduced to 0 psig over about 45 minutes, During this time, the temperature of the contents rose to 255° C. The autoclave pressure was reduced to 5 psia by applying vacuum and held there for 20 minutes. The autoclave was then pressurized with 65 psia nitrogen and the molten polymer was extruded into strands, quenched with cold water and cut into pellets. The co-polyamide obtained had an inherent viscosity (IV) of 0.97 dl/g. The polymer had a melting point of 213° C., as measured by differential scanning calorimetry (DSC).

Synthesis of PA 616

Salt Preparation and polymerization: A 10 L autoclave was charged with hexadecanedioic acid (2543 g), an aqueous solution containing 78.4 weight % of hexamethylene diamine (HMD) (1327 g), an aqueous solution containing 28 weight percent acetic acid (14 g), an aqueous solution containing 1 weight percent sodium hypophosphite (33 g), an aqueous solution containing 1 weight percent Carbowax 8000 (10 g), and water (2630 g). The process conditions were the same as that described above for PA614.
The co-polyamide obtained had an inherent viscosity (IV) of 1.00 dl/g. The polymer had a melting point of 207° C., as measured by differential scanning calorimetry (DSC).

Synthesis of 614/616 (50/50)

Salt Preparation and polymerization: A 10 L autoclave was charged with tetradecanedioic acid (1189 g), hexadecanedoic acid (1317 g), an aqueous solution containing 78.4 weight % of hexamethylene diamine (HMD) (1374 g), an aqueous solution containing 28 weight percent acetic acid (14 g), an aqueous solution containing 1 weight percent sodium hypophosphite (33 g), an aqueous solution containing 1 weight percent Carbowax 8000 (10 g), and water (2620 g). The process conditions were the same as that described above for PA614.
The co-polyimide obtained had an inherent viscosity (IV) of 1.04 dl/g. The polymer had a melting point of 185° C., as measured by differential scanning calorimetry (DSC).

Synthesis of PA 614/616 (70/30)

Salt Preparation and polymerization: A 10 L autoclave was charged with tetradecanedioic acid (1688 g), hexadecanedoic acid (802 g) an aqueous solution containing 78.4 weight % of hexamethylene diamine (HMD) (1394 g), an aqueous solution containing 28 weight percent acetic acid (14 g), an aqueous solution containing 1 weight percent sodium hypophosphite (33 g), an aqueous solution containing 1 weight percent Carbowax 8000 (10 g), and water (2615 g). The process conditions were the same as that described above for PA614.
The co-polyamide obtained had an inherent viscosity (IV) of 1.04 dl/g. The polymer had a melting point of 200° C., as measured by differential scanning calorimetry (DSC).

Table 2 lists the properties of PA 612, PA 614, PA 616, PA 614/616 (50/50), and PA 614/616 (70/30).

TABLE 2

Properties of Polymers used in Examples and Comparative Examples

| | Polymer Type (Composition) | | | | |
|---|---|---|---|---|---|
| | PA612 | PA614 | PA616 | PA614/ 616 (50/50) | PA614/ 616 (70/30) |
| DSC data | | | | | |
| Melting point (° C.) | 218 | 213 | 207 | 185 | 200 |
| Heat of fusion (J/g) | 65 | 62 | 65 | 59 | 61 |

TABLE 2-continued

Properties of Polymers used in Examples and Comparative Examples

| | Polymer Type (Composition) | | | | |
|---|---|---|---|---|---|
| | PA612 | PA614 | PA616 | PA614/ 616 (50/50) | PA614/ 616 (70/30) |
| Freezing point (° C.) | 188 | 179 | 180 | 166 | 172 |
| Delta T (MP − FP) (° C.) | 40 | 34.2 | 27 | 19 | 28 |
| DMA data | | | | | |
| Storage modulus, 23° C. (MPa) | 1988 | 1781 | 1473 | 1446 | 1431 |
| Storage modulus, 125° C. (MPa) | 362 | 323 | 280 | 173 | 215 |
| Tan delta | 52.8 | 59 | 60 | 53 | 56 |
| Tan delta peak value | 0.11 | 0.11 | 0.11 | 0.13 | 0.12 |
| Mechanical properties | | | | | |
| TS, 23° C. (MPa) | 58.5 | 52 | 50 | 49 | 48 |
| Flex Modulus (Mpa) | | 1938 | 1781 | 1660 | 1609 |
| TM, 23° C. (MPa) | 2000 | 1805 | 1697 | 1578 | 1513 |
| TM, 125° C. (MPa) | 286 | 267 | 243 | 162 | 199 |
| Salt stress crack resistance | | | | | |
| Hours (h) to failure at 50° C. | 3 h | >95 h, failure at 167 h[a] | No failures to 191 h, failure after 24 h drying | >95 h, failure at 167 h[a] | >95 h, failure at 167 h[a] |

[a] no observation available between 95 h and 167 h

Synthesis of PA 618

A 10 L autoclave was charged with octadecanedioic acid (2610 g), an aqueous solution containing 78.4 weight % of hexamethylene diamine (HMD) (1240 g), an aqueous solution containing 28 weight percent acetic acid (14 g), an aqueous solution containing 1 weight percent sodium hypophosphite (33 g), an aqueous solution containing 1 weight percent Carbowax 8000 (10 g), and water (2650 g). The process conditions were the same as that described above for PA616.

The co-polyamide obtained had an inherent viscosity (IV) of 1.15 dl/g. The polymer had a melting point of 199° C., as measured by DSC.

Synthesis of PA 616/618 (47/53)

A 10 L autoclave was charged with hexadecane dioic acid (1160 g), octadecanedioic acid (1419 g), an aqueous solution containing 78.4 weight % of hexamethylene diamine (HMD) (1280 g), an aqueous solution containing 28 weight percent acetic acid (14 g), an aqueous solution containing 1 weight percent sodium hypophosphite (33 g), an aqueous solution containing 1 weight percent Carbowax 8000 (10 g), and water (2460 g). The process conditions were the same as that described above for PA616.

The co-polyamide obtained had an inherent viscosity (IV) of 1.04 dl/g. The polymer had a melting point of 185° C., as measured by DSC. Other properties are listed in Table 3.

Synthesis of PA 616/618 (90/10)

Salt Preparation: A 10 L autoclave was charged with hexadecane dioic acid (2275 g), octadecanedioic acid (277 g), an aqueous solution containing 78.4 weight % of hexamethylene diamine (HMD) (1317 g), an aqueous solution containing 28 weight percent acetic acid (14 g), an aqueous solution containing 1 weight percent sodium hypophosphite (33 g), an aqueous solution containing 1 weight percent Carbowax 8000 (10 g), and water (2630 g). The process conditions were the same as that described above for PA616.

The co-polyamide obtained had an inherent viscosity (IV) of 0.97 dl/g. The polymer had a melting point of 204° C., as measured by differential scanning calorimetry (DSC). Other properties are listed in Table 3.

Synthesis of PA 616/618 (10/90)

Salt Preparation: A 10 L autoclave was charged with hexadecane dioic acid (239 g), octadecanedioic acid (2365 g), an aqueous solution containing 78.4 weight % of hexamethylene diamine (HMD) (1248 g), an aqueous solution containing 28 weight percent acetic acid (14 g), an aqueous solution containing 1 weight percent sodium hypophosphite (33 g), an aqueous solution containing 1 weight percent Carbowax 8000 (10 g), and water (2630 g). The process conditions were the same as that described above for PA616.

The co-polyamide obtained had an inherent viscosity (IV) of 1.01 dl/g. The polymer had a melting point of 191° C., as measured by differential scanning calorimetry (DSC).

Table 3 lists thermal and physical properties of PA618 homopolymers and PA 616/618 copolymers.

TABLE 3

| | Polymer Type | | | |
|---|---|---|---|---|
| | PA618 | PA 616/618 47/53 | PA616/ 618 90/10 | PA616/ 618 10/90 |
| Melt Point (° C.) | 192 | 185 | 204 | 191 |
| Heat of fusion (J/g) | 67 | 67 | 67 | 67 |
| Freeze Point (° C.) | 164 | 165 | 179 | 169 |
| Delta T (MP − FP) (° C.) | 28 | 20 | 26 | 22 |
| Storage modulus at 23° C. (MPa) | 1355 | 1356 | 1432 | 1317 |
| Tan delta | 53 | 56 | 58 | 54 |
| Tan delta peak value | 0.12 | 0.13 | 0.11 | 0.12 |
| Mechanical properties | | | | |
| TS, 23° C. (MPa) | 45 | 45 | 50 | 44 |
| Flex Modulus (Mpa) | 1475 | 1514 | 1743 | 1477 |
| TM, 23° C. (MPa) | 1534 | 1517 | 1695 | 1468 |
| TM, 125° C. (MPa) | | 137 | 225 | 173 |
| Salt stress crack resistance | | | | |
| Hours (h) to failure at 50° C. | No failures to 191 h and 24 h drying | NA | No failures to 191 h, failure after 24 h drying | No failures to 191 h, and 24 h drying |

PA66 refers to an aliphatic polyamide made of 1,6-hexanedioic acid and 1,6-hexamethylenediamine having an relative viscosity in the range of 46-51 and a melting point of about 263° C., commercially available from E.I. DuPont de Nemours and Company, Wilmington, Del., USA under the trademark Zytel® 101NC010.

PA612 having a melting point of about 218° C. is available from E. I. du Pont de Nemours and Company, Wilmington, Del.

Glass fibers C refers to CRC 301 HP chopped glass fiber available from Chongqing Polycomp International Corp., Chongqing, China.

Glass Fiber E refers to PPG 3660 chopped glass fiber available from PPG Industries, Pittsburgh, Pa.

TRX®301 copolymer refers to a maleic anhydride modified EPDM available from E.I. DuPont de Nemours and Company, Wilmington, Del., USA.

Engage® 8180 copolymer refers to an ethylene-octene copolymer consisting of 72 weight percent ethylene and 28 weight percent 1-octene commercially available from Dow Chemical Co., Midland, Mich.

Cu heat stabilizer refers to a mixture of 7 parts of potassium iodide and 1 part of copper iodide in 1 part of a stearate wax binder.

Licomont® CaV 102 fine grain is calcium salt of montanic add available from Clariant Corp., 4132 Mattenz, Switzerland.

Lubricant is aluminum distearate

EXAMPLES

Examples 1-13 illustrate the properties of the thermoplastic polyamide compositions useful in making the composite wheels.

TABLE 4

Examples and Comparative Examples of Thermoplastic Compositions.

| | Example | | | | | |
|---|---|---|---|---|---|---|
| | C-1 | 1 | 2 | 3 | 4 | 5 |
| PA 612 | 66.9 | | | | | |
| PA612/614 (70/30) | | 66.9 | | | | |
| PA612/614 (80/20) | | | 66.9 | | | |
| PA612/614/616 (65/25/10) | | | | 66.9 | | |
| PA612/614/616 (60/25/15) | | | | | 66.9 | |
| PA612/614/616 (65/20/15) | | | | | | 66.9 |
| Glass fiber C | 33 | 33 | 33 | 33 | 33 | 33 |
| lubricant | 0.1 | 0.1 | 0.1 | 0.1 | 0.1 | 0.1 |
| Properties | | | | | | |
| TS, 23° C. (MPa) | 188 | 172 | 177 | 173 | 168 | 173 |
| Flexural modulus (MPa) | 9290 | 8850 | 8800 | 8480 | 8460 | 8780 |

The compositions of Table 5 and 6 were compounded with a 26 mm 13-barrel twin screw extruder at 250 RPM screw speed, 40 pounds per hour throughput, and barrel temperature setting of 250~270° C. All ingredients were fed from the back of the extruder except the chopped glass fibers which were fed from side of the extruder. PA 612 used in comparative examples was Zytel® 158 NC010 resin.

The compounded pellets were dried and molded into 4 mm ISO multipurpose tensile bars on a Nissei Injection Molding Machine FN3000 with barrel temperature setting of 260~270° C. and with a general compression screw.

TABLE 5

| | Examples | | | | | | |
|---|---|---|---|---|---|---|---|
| | C-2 | C-3 | C-4 | 6 | 7 | 8 | 9 |
| PA66 | 49.96 | 0 | 0 | 0 | 0 | 0 | 0 |
| PA612 | 0 | 59.35 | 49.96 | 0 | 0 | 0 | 0 |
| PA614 | 0 | 0 | 0 | 59.35 | 49.96 | 0 | 0 |
| PA612/614 (70/30) | 0 | 0 | 0 | 0 | 0 | 59.35 | 49.96 |
| TRX-301 | 3.75 | 0 | 3.75 | 0 | 3.75 | 0 | 3.75 |
| Engage8180 | 5.64 | 0 | 5.64 | 0 | 5.64 | 0 | 5.64 |
| Cu heat stabilizer | 0.4 | 0.4 | 0.4 | 0.4 | 0.4 | 0.4 | 0.4 |
| Licomont ® CaV 102 | 0.25 | 0.25 | 0.25 | 0.25 | 0.25 | 0.25 | 0.25 |
| Glass Fiber E | 40 | 40 | 40 | 40 | 40 | 40 | 40 |
| Properties | | | | | | | |
| Tensile Strength (Mpa) | 195 | 170 | 141 | 160 | 145 | 161 | 140 |
| Elongation (%) | 2.89 | 2.66 | 4.06 | 2.39 | 5.44 | 2.5 | 6.04 |
| T Modulus (mpa) | 11169 | 11750 | 10427 | 11419 | 10467 | 11181 | 10507 |
| Notched Izod (KJ/m2) | 21.6 | 14.5 | 27.6 | 13.7 | 28.6 | 13.2 | 28.7 |
| Unnotched Izod (KJ/m2) | 90.5 | 63.4 | 89 | 57.7 | 86 | 59.3 | 92.3 |

The compositions of Table 4 were prepared by melt blending the formulation ingredients in a Werner & Pfleiderer ZSK 30 operating at about 28° C. using a screw speed of about 300 rpm, a throughput of about 30 lbs/hour and a melt temperature measured by hand of about 290° C. The glass fibers were added to the melt through a screw side feeder. Ingredient quantities shown in Table 4 are given in weight percent on the basis of the total weight of the thermoplastic composition.

TABLE 6

| | Examples | | | |
|---|---|---|---|---|
| | 10 | 11 | 12 | 13 |
| PA616 | 59.35 | 49.96 | 0 | 0 |
| PA614/616 (70/30) | 0 | 0 | 59.35 | 49.96 |
| TRX-301 | 0 | 3.75 | 0 | 3.75 |
| Engage8180 | 0 | 5.64 | 0 | 5.64 |
| Cu heat stabilizer | 0.4 | 0.4 | 0.4 | 0.4 |

TABLE 6-continued

| | Examples | | | |
|---|---|---|---|---|
| | 10 | 11 | 12 | 13 |
| Licomont ® CaV 102 | 0.25 | 0.25 | 0.25 | 0.25 |
| Glass Fiber E | 40 | 40 | 40 | 40 |
| Properties | | | | |
| Tensile Strength (Mpa) | 146 | 135 | 147 | 137 |
| Elongation (%) | 2.32 | 7.09 | 2.28 | 6.03 |
| T Modulus (mpa) | 10818 | 9754 | 10556 | 10100 |
| Notched Izod (KJ/m2) | 12.9 | 33.2 | 11.5 | 26 |
| Unnotched Izod (KJ/m2) | 55.3 | 95 | 54 | 84.8 |

Table 7 lists the average number of throws to break of various compositions.

TABLE 7

| | Example | | |
|---|---|---|---|
| | C-5 | C-2 | 7 |
| Average Upward Vertical Impacts before break | 1.2 | 1 | 1.75 |
| Average Downward Vertical Impacts before break | 1 | 1.5 | 4.5 |

C-5 is a commercial grade of PA 66 including 43 wt % glass fiber and no toughener Examples 7, 9, 11 and 13, with toughener present, show significant improvement in elongation to break over that of Comparative Example C-4 to having PA 612. Example 7 shows significantly improved resistance to cracking in vertical impacts versus typical PA 66 composite compositions.

We claim:

1. An injection molded composite wheel, comprising a thermoplastic polyamide composition comprising (A) 20 to 70 weight percent of at least one polyamide resin consisting of at least two repeat units selected from the group consisting of the formulas $$—C(O)(CH_2)_{10}C(O)NH(CH_2)_n NH— \quad (I),$$

$$—C(O)(CH_2)_{12}C(O)NH(CH_2)_n NH— \quad (II),$$

$$—C(O)(CH_2)_{14}C(O)NH(CH_2)_n NH— \quad (III), \text{ and}$$

$$—C(O)(CH_2)_{16}C(O)NH(CH_2)_n NH— \quad (IV);$$

wherein:

n is 6;

the polyamide resin consists of repeat units of formula (I) and at least 30 mol % of one other repeat unit of formula (II) to (IV); or the polyamide resin consists of 8 to 92 mole percent repeat units of formula (II) and 8 to 92 mole percent of repeat units of formula (III); or the polyamide resin consists of 8 to 92 mole percent repeat units of formula (III) and 8 to 92 mole percent of repeat units of formula (IV); or the polyamide resin consists of 4 to 92 mole percent repeat units of formula (II), 4 to 92 mole percent repeat units of formula (III), and 4 to 92 repeat units of formula (IV); and the polyamide resin has a melting point of 185° C. to 209° C. measured by DSC using ASTM D3418 at a heating rate of 10° C./min;

(B) 20 to 65 weight percent of one or more fiber reinforcing agents; and (C) 0 to 20 weight percent of one or more polymeric toughener;

wherein the weight percentages of (A), (B), and (C) are based on the total weight of (A)+(B)+(C).

2. The composite wheel of claim 1 that comprises a polyamide composition comprising (A) 20 to 68 weight percent of at least one polyamide resin, (B) 30 to about 65 weight percent of one or more fiber reinforcing agents, preferably wherein said fiber has an average length of 0.1 to 0.9 mm; and (C) 2 to 20 weight percent of one or more polymeric tougheners.

3. The composite wheel of claim 1 wherein 4 mm test bars prepared from said polyamide composition have an average tensile modulus greater than or equal to about 8.5 GPa, as measured by ISO 527-1/2 and an elongation at break of at least 4% as tested according to ISO 527-2/1A.

4. The composite wheel of claim 1 wherein rectangular test pieces measuring 50 mm×12 mm×3.2 mm, prepared from said polyamide resin, have a resistance to 50% by weight aqueous solution of $ZnCl_2$ of at least 24 hours at 50° C., when measured according to ASTM D1693, Condition A, adapted for determining stress cracking resistance of the polyamide compositions.

5. The composite wheel of claim 1 wherein said repeat units (I), (II), (III) and (IV) are prepared from C12, C14, C16 or C18 dioic acids, respectively, derived from microbial oxidation of linear alkanes.

6. The composite wheel of claim 5 wherein the linear alkanes are derived from hydrotreating of vegetable oils selected from the group consisting of soybean oil, palm oil, palm kernel oil, coconut oil, sunflower oil, olive oil, cotton seed oil, peanut oil, and corn oil.

* * * * *